US007120607B2

(12) United States Patent
Bolle et al.

(10) Patent No.: US 7,120,607 B2
(45) Date of Patent: Oct. 10, 2006

(54) BUSINESS SYSTEM AND METHOD USING A DISTORTED BIOMETRICS

(75) Inventors: Rudolf Maarten Bolle, Bedford Hills, NY (US); Jonathan H. Connell, Cortlandt Manor, NY (US); Nalini K. Ratha, White Plains, NY (US); Louis J. Percello, Armonk, NY (US)

(73) Assignee: Lenovo (Singapore) PTE. Ltd., Singapore (SG)

( * ) Notice: Subject to any disclaimer, the term of this patent is extended or adjusted under 35 U.S.C. 154(b) by 78 days.

(21) Appl. No.: 10/623,926

(22) Filed: Jul. 21, 2003

(65) Prior Publication Data

US 2004/0019570 A1 Jan. 29, 2004

Related U.S. Application Data

(63) Continuation of application No. 09/596,085, filed on Jun. 16, 2000, now abandoned.

(51) Int. Cl.
*G06Q 99/00* (2006.01)

(52) U.S. Cl. ............................ 705/64; 705/70; 705/74; 705/75; 705/76; 713/186; 726/5; 726/19; 340/5.52; 340/5.53; 340/5.82; 340/5.83; 902/2; 902/4; 902/24

(58) Field of Classification Search ............ 705/64–79; 713/200–202, 183, 185, 186; 382/115–126; 340/5.52, 5.53, 5.82–5.84; 902/2, 4, 25; 726/5, 19
See application file for complete search history.

(56) References Cited

U.S. PATENT DOCUMENTS 4,972,476 A 11/1990 Nathans

| 4,993,068 | A |   | 2/1991  | Piosenka et al. |
|-----------|---|---|---------|-----------------|
| 5,261,002 | A |   | 11/1993 | Perlman et al. |
| 5,434,917 | A |   | 7/1995  | Naccache et al. |
| 5,485,312 | A |   | 1/1996  | Horner et al. |
| 5,590,261 | A |   | 12/1996 | Sclaroff et al. |
| 5,613,012 | A |   | 3/1997  | Hoffman et al. |
| 5,644,645 | A | * | 7/1997  | Osuga ........................ 382/124 |
| 5,666,416 | A |   | 9/1997  | Micali |
| 5,717,758 | A |   | 2/1998  | Micall |
| 5,793,868 | A |   | 8/1998  | Micali |
| 5,930,804 | A |   | 7/1999  | Yu et al. |
| 6,092,192 | A | * | 7/2000  | Kanevsky et al. .......... 713/186 |
| 6,202,151 | B1| * | 3/2001  | Musgrave et al. .......... 713/186 |
| 6,310,966 | B1| * | 10/2001 | Dulude et al. .............. 382/115 |
| 6,532,541 | B1| * | 3/2003  | Chang et al. ............... 713/176 |
| 6,657,538 | B1| * | 12/2003 | Ritter ........................ 340/5.81 |
| 6,735,695 | B1| * | 5/2004  | Gopalakrishnan et al. .. 713/186 |
| 2002/0025062 | A1 | * | 2/2002 | Black ......................... 382/116 |
| 2003/0225693 | A1 | * | 12/2003 | Ballard et al. ................ 705/42 |

FOREIGN PATENT DOCUMENTS

WO WO 98/41947 * 9/1998

OTHER PUBLICATIONS

Ashburn J., "The Biometric White Paper," http://homepage.ntlworld.com/avanti/whitepaper.htm, pub. 1999.

(Continued)

*Primary Examiner*—Jalatee Worjloh
(74) *Attorney, Agent, or Firm*—John L. Rogitz

(57) ABSTRACT

A method of doing business is disclosed that transforms a biometric used by a user in a transaction. The transformation creates a distorted biometric. The distorted biometric is used to identify the user to another party without requiring the user to provide actual physical or behavioral characteristics about himself to the other party.

18 Claims, 21 Drawing Sheets

OTHER PUBLICATIONS

Fabien et al., "Evaluation of Copyright Marking Systems," Proceedings of IEEE Multimedia Systems '99, vol. 1, pp. 574-579 (Jun. 1990).

"IBIA Letter to U.S. Department of Health and Human Services Providing Comment on the Proposed 'Standards for Privacy of Individually Identifiable Health Information'," Feb. 4, 2000.

* cited by examiner

BUSINESS SYSTEM AND METHOD USING A DISTORTED BIOMETRICS

CROSS REFERENCE TO RELATED APPLICATIONS

This application is related to U.S. patent application Ser. No. 09/595,925, filed on Jun. 16, 2000, and entitled SYSTEM AND METHOD FOR DISTORTING A BIOMETRIC FOR TRANSACTIONS WITH ENHANCED SECURITY AND PRIVACY, to Bolle et al.

This application is a continuation of U.S. patent application Ser. No. 09/596,085, filed on Jun. 16, 2000 now abandoned.

FIELD OF THE INVENTION

This invention relates to the field of image processing. More specifically, this invention relates to intentionally distorting the machine representation of biometrics and then using the distorted biometrics in secure and privacy-preserving business transactions.

BACKGROUND OF THE INVENTION

A biometric is a physical or behavioral characteristics of a person that can be used to determine or authenticate a person's identity. Biometrics such as fingerprint impressions have been used in law enforcement agencies for decades to identify criminals. More recently, other biometrics such as face, iris and signature are starting to be used to identify persons in many types of transactions, e.g., check cashing and ATM use. An automated biometrics identification system analyzes a biometrics signal using pattern recognition techniques and arrives at a decision whether the query biometrics signal is already present in the database. An authentication system tests whether the query biometrics is equal, or similar, to the stored biometrics associated with the claimed identity. A generic automated biometrics system has three stages: (i) signal acquisition; (ii) signal representation and (iii) pattern matching.

Authentication of a person is a fundamental task in many day to day activities. Several well established processes such as possession of driver's license, passwords, ATM cards, PINs and combinations thereof are used depending on the level of security needed by the application. Transaction oriented systems such as bank ATMs, point-of-sale terminals in retail stores require authentication tools for every transaction session. In a typical transaction, the client computer (ATM machine, cash register) transmits the account details of the customer as read from his card and the transaction details as entered by the clerk (or customer) to an authorization server. The authorization server checks the validity of the account, the account balance and credit limit, and then approves or rejects the transaction. Approved credit card transactions result in payment from the credit card banking agencies to the store; approved ATM withdrawal transactions result in delivering of cash by the ATM. For transactions such as the self-serve purchase of gasoline, simply the possession of a credit card is often enough. There is no attempt to determine that the card is used by the rightful owner. Except for the use of PINs (in ATMs and for debit cards) or a signature on the credit card authorization slip in a store, there is very little done to authenticate the user. Biometrics can play a significant role in such scenarios.

PROBLEMS WITH THE PRIOR ART

One of the impediments in advancing the use of biometric authentication in commercial transaction systems is the public's perception of invasion of privacy. Beyond private information such as name, date of birth and other parametric data like that, the user is asked to give images of their body parts, such as fingers, faces and iris. These images, or other biometrics signals, will be stored in digital form in databases in many cases. With this digital technology, it may be very easy to copy biometrics signals and use the data for other purposes. For example, hackers could snoop on communication channels and intercept biometric signals and reuse them without the knowledge of the proper owner of the biometrics. Another concern is the possible sharing of databases of biometrics signals with law enforcement agencies, or sharing of these databases among commercial organizations. The latter, of course, is a concern for any data gathered about customers. These privacy concerns can be summarized as follows:

1. Much data about customers and customer behavior is stored. The public is concerned about every bit of additional information that is known about them.
2. The public is, in general, suspicious of central storage of information that is associated with individuals. This type of data ranges from medical records to biometrics. These databases can be used and misused for all sorts of purposes, and the databases can be shared among organizations.
3. The public is, rightfully or wrongfully so, worried about giving out biometrics because these could be used for matching against databases used by law enforcement agencies. They could be, for example, be matched against the FBI or INS fingerprint databases to obtain criminal records or immigration status (or lack thereof).

Hence, the transmission and storage of biometrics coupled with other personal parametric data is a concern. The potential use of these biometrics for searching other databases is a further concern.

Many of these concerns are aggravated by the fact that a biometrics cannot be changed. One of the properties that make biometrics so attractive for authentication purposes, their invariance over time, is also one of the liabilities of biometrics. When a credit card number is somehow compromised, the issuing bank can assign the customer a new credit card number. In general, when using artificial means, such an authentication problem can be easily fixed by canceling the compromised token and reissuing a new token to the user. When a biometrics is compromised, however, the user has very few options. In the case of fingerprints, the user has nine other options (his other fingers), but in the case of face or iris, the alternatives are quickly exhausted or nonexistent.

A further inconvenience of biometrics is that the same biometrics may be used for several, unrelated applications. That is, the user may enroll for several different services using the same biometrics: for building access, for computer login, for ATM use and so on. If the biometrics is compromised in one application, the biometrics is essentially compromised for all of them and somehow would need to be changed.

Several items of prior art propose methods for revoking keys and other authentication tokens. Because the keys and certificates are machine generated, they are easy to revoke conceptually.

U.S. Pat. No. 5,930,804 to Yu et al. describes a web-based authentication system using biometrics. They disclose a general method to capture the biometrics signal of a user at a client station and then have a remote server authenticate the user based on the acquired signal. They are also concerned with generating and comparing audit trails to catch people who repeatedly try to gain unauthorized access to the system. Still, if the acquired biometric signal or its representation on the server is successfully compromised, the user has to change the biometrics (say his finger). If the biometrics happens to be a component like his face where there is only one possible option, the system will fail to function for the user. Moreover, gaining access to the original undistorted biometric from one institution may let the perpetrator access other accounts associated with the user at other unrelated institutions.

Y-P Yu, S. Wong and M. B. Hoffberg, Web-based biometric authentication system and method," U.S. Pat. No. 5,930,804, July 1999.

U.S. Pat. No. 5,613,012 to Hoffman et al. describes a similar tokenless identification method for authorization of electronic transactions using biometrics over a network. This method also has the special feature of allowing the user to store a private code with the authentication server which can then be returned with the match results to indicate that the true authentication server was used for matching. However, this disclosure also suffers from the same problems as described above. If the biometric used in the authentication is compromised, there is no automatic method to replace it. Also, there is no way to mask the user's true biometric, nor to prevent exactly the same biometric from being stored on several different authentication servers.

N. Hoffman, D. F. Pare and J. A. Lee, "Tokenless identification system for authorization of electronic transactions and electronic transmissions", U.S. Pat. No. 5,613,012, March 1997.

A prior art image morphing technique that create intermediate images to be viewed serially to make an source object metamorphose into a different object is disclosed in Stanley E. Sclaroff and Alex Pentland, "Finite-element method for image alignment and morphing", U.S. Pat. No. 5,590,261, December 1996.

The above referenced patents are incorporated herein by reference in its entirety.

U.S. Pat. No. 5,590,261 to Sclaroff and Pentland describes a finite element-based method to determine the intermediate images based on motion modes of embedded nodal points in the source and the target image. Embedded nodal points that correspond to feature points in the images are represented by a generalized feature vector. Correspondence of feature points in the source and target image are determined by closeness of points in the feature vector space. This technique is applied to the field of video production not biometrics, and focuses on a correspondence assignment technique that reduces the degree to which human intervention is required in morphing. Furthermore, for this technique to be applicable the source and the target images must be known.

The following references are incorporated by reference in their entirety:

Silvio Micali, "Certificate revocation system", U.S. Pat. No. 5,793,868, August 1998.

Silvio Micali, "Certificate revocation system", U.S. Pat. No. 5,666,416, September, 1997.

Silvio Micali, "Witness-based certificate revocation system", U.S. Pat. No. 5,717,758, February 1998.

U.S. Pat. No. 5,793,868 to S. Micali discloses certificate management involving a certification authority (CA). Often when the key in a public key infrastructure has been compromised, or the user is no longer a client of a particular CA, the certificate has to be revoked. The CA periodically issues a certificate revocation list (CRL) which is very long and needs to be broadcast to all. The disclosure proposes to generate a hash of at least a part of the certificate. Minimal data identifying the certificate is added to the CRL if the data items are shared by two or more revoked certificates. The proposed method thus optimizes the size of the CRL hence lessening transmission time. U.S. Pat. No. 5,793,868 deals with machine generated certificates, not signals of body parts. Furthermore, it is concerned with making the revocation process more efficient rather than with making it possible at all.

U.S. Pat. No. 5,666,416 to S. Micali deals with public key management without explicitly providing any list of revoked certificates. A user can receive an individual piece of information about any public key certificate. Methods are described to provide positive information about the validity status of each not-yet expired certificate. In the proposed method, the CA will provide certificate validity information without requiring a trusted directory. In addition, it also describes schemes to prove that a certificate was never issued or even existed in a CA. The techniques described here are only applicable to machine generated keys that are easily canceled, not to biometrics.

U.S. Pat. No. 5,717,758 to S. Micali further deals with a public key infrastructure. In the proposed scheme, an intermediary provides certificate information by receiving authenticated certificate information, then processing a portion of the authenticated information to obtain the deduced information. If the deduced information is consistent with the authentication information, a witness constructs the deduced information and authenticates the deduced information. The main novelty of the disclosure is that it avoids transmission of long certificate revocation list (CRL) to all users and handling of non-standard CRL is left to the intermediary. The method addresses issues relevant to machine generated keys and their management, but not to biometrics signals. And, again, the focus is on the privacy of certificates and the efficiency of revocation, not on making revocation possible in the first place.

The following reference is incorporated by reference in its entirety:

R. J. Perlman and C. W. Kaufman, "Method of issuance and revocation of certificate of authenticity used in public key networks and other systems", U.S. Pat. No. 5,261,002, November 1993.

U.S. Pat. No. 5,261,002 to Perlman and Kaufman describes a technique to issue and revoke user certificates containing no expiration dates. The lack of expiration dates minimizes overhead associated with routine renewals. The proposed method issues a signed list of invalid certificates (referred to as a blacklist) containing a blacklist start date, a blacklist expiration date, and an entry for each user whose certificate was issued after the black list start date but is invalid now. The method describes revocation and issuance of machine generated certificates but does not address the special properties of biometrics.

Standard cryptographic methods and biometric images or signals are combined in the following reference (incorporated by reference in its entirety):

G. V. Piosenka and R. V. Chandos, "Unforgeable personal identification system", U.S. Pat. No. 4,993,068, February 1991 (Piosenka).

U.S. Pat. No. 4,993,068 to Piosenka and Chandos deals with combining standard cryptographic methods and biometric images or signals. The proposed scheme encrypts a set of physically immutable identification credentials (e.g., biometrics) of a user and stores them on a portable memory device. It uses modem public key or one-way cryptographic techniques to make the set of credentials unforgeable. These credentials are stored in a credit-card sized portable memory device for privacy. At a remote site, the user presents the physical biometrics (i.e. himself or his body parts) and the portable memory card for comparison by a server. This technique, though useful, is susceptible to standard attacks on the encryption scheme and can potentially expose the biometrics if the encryption is broken. Furthermore, after decryption the true biometrics signals are available to the server for possible comparison with other databases thus lessening personal privacy.

The following reference is incorporated by reference in its entirety:

D. Naccache and P. Fremanteau, "Unforgeable identification device, identification device reader and method of identification", U.S. Pat. No. 5,434,917, July 1995.

U.S. Pat. No. 5,434,917 to Naccache and Fremanteau deals with designing an unforgeable memory card at an affordable price without the need to have a processor on the card. The plastic support of the card is manufactured with randomly distributed ferrite particles. This unique distribution of particles is combined with standard user identification information to create a secure digital signature. The digital signature along with the owner ID is then stored on the card (by use of a magnetic strip or similar means). The reader authenticates the user by reading the ID and also sensing the ferrite particle distribution. It then checks that the stored digital signature is the same signature as would be formed by combining the given ID and the observed particle distribution. The unforgeable part of the technique is related to the random distribution of ferrite particles in the plastic substrate during the fabrication process. The identification details of the owner are not related to biometrics.

A software system called "Stirmark" to evaluate robustness of data hiding techniques is described in:

A. P. Petitcolas and R. J. Anderson, "Evaluation of copyright marking systems", Proc. IEEE Multimedia Systems 99, Vol. 1, pp. 574–579, pp. 7–11, June 1999.

The system Stirmark explained in this reference applies minor, unnoticeable geometric distortions in terms of slight stretches, shears, shifts, bends, and rotations. Stirmark also introduces high frequency displacements, a modulated low frequency deviation, and smoothly distributed error into samples for testing data hiding techniques. This disclosure is concerned with testing if a watermark hidden in the signal can be recovered even after these unnoticeable distortions. This system does not intentionally distort a signal in order to enhance privacy or to allow for revocation of authorization.

This reference is herein incorporated by reference in its entirety.

OBJECTS OF THE INVENTION

An object of this invention is an improved system and method for using biometrics.

An object of this invention is an improved system and method for using biometrics in business transactions.

An object of this invention is an improved system and method of doing business transactions while maintaining the privacy of the transactor.

SUMMARY OF THE INVENTION

The present invention is a method of doing business that transforms a biometric used by a user in a transaction. The transformation creates a distorted biometric. The distorted biometric is used to authenticate the user to another party without requiring the user to provide actual physical or behavioral characteristics about himself to the other party. The authenticating party only stores an identifier (ID number) plus the transformed biometric or its representation. Therefore, no other information about the user can be retrieved from other business or governmental (biometric) businesses.

BRIEF DESCRIPTION OF THE DRAWINGS

FIG. 3, comprised of FIGS. 3A and 3B, gives flow diagrams of the signal transformations, where:

DETAILED DESCRIPTION OF THE INVENTION

Figure 1:
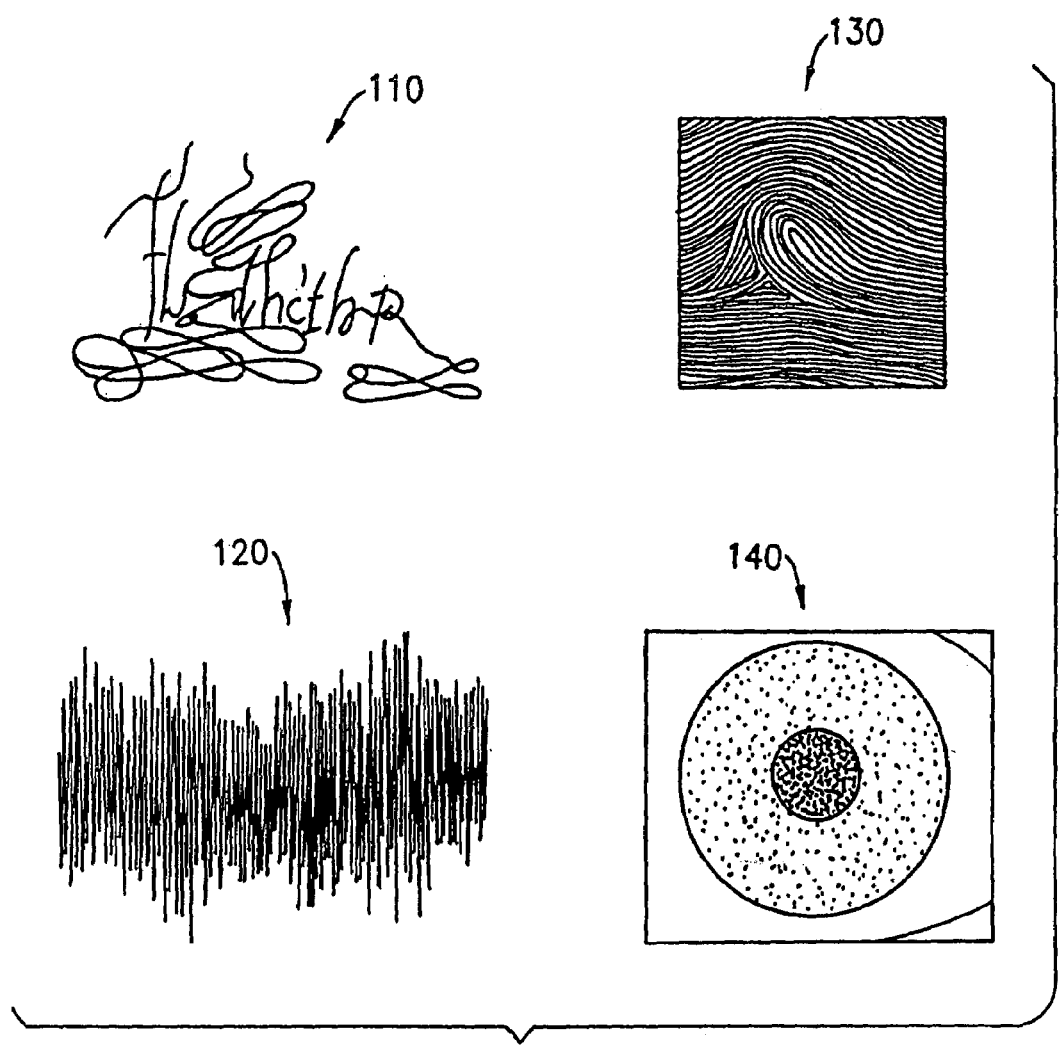
FIG. 1 gives prior art examples of traditional biometrics.

A system and method further embodying this invention is more fully described and claimed in U.S. patent application Ser. No. 09/595,925, filed on the same day as this disclosure, and entitled SYSTEM AND METHOD FOR DISTORTING A BIOMETRIC FOR TRANSACTIONS WITH ENHANCED SECURITY AND PRIVACY, to Bolle et al., which is herein incorporated by reference in its entirety.

The present invention introduces cancelable biometrics and their use in business transactions. Unlike traditional biometrics, these biometrics can be changed when somehow compromised. A cancelable biometrics is a transformation of the biometrics which result in a intentional distorted representation of the same format as the original biometrics. This distortion is repeatable in the sense that, irrespective of variations in recording conditions of the original biometric, it generates the same (or very similar) distorted biometric each time. If the distortion is constructed to be noninvertible then the original biometric can never be derived from the cancelable biometric, thus ensuring extra privacy for the user. In any case the distorted biometric represents a user without revealing the true features of the original biometric and/or the identity of the user (e.g. owner of the biometric). So even if the distorted biometric is invertible, one can not relate the distorted biometric to the original biometric without inverting the distorted biometric.

While data encryption and image compression might be considered distortion transforms, the present invention is different from these prior art techniques. In encryption, the transmitted signal is not useful in its raw form; it must be decrypted at the receiving end. Furthermore, all encryption systems are, by design, based on invertable transforms and will not work with noninvertable functions. With encryption systems, it would still be possible to share the signal with other agencies without the knowledge of the owner. In compression, there exist lossy methods which do not preserve all the details of the original signal. Such transforms are indeed noninvertable. Depending on the exact method of compression, there are even some image processing operations that can performed directly on the compressed data. In general, however, the data is decompressed before being used. And, unlike encryption, the method for doing this is usually widely known and thus can be applied by any party. Moreover, the decompressed signal is, by construction, very close to the original signal. Thus it can often be used directly in place of the original signal so there is no security benefit to be gained by this transformation. Furthermore, altering the parameters of the compression engine (to cancel a previous distortion) will result in a decompressed signal which is still very similar to the original.

Traditional biometrics, such as fingerprints, have been used for (automatic) authentication and identification purposes for several decades. Signatures have been accepted as a legally binding proof of identity and automated signature authentication/verification methods have been available for at least 20 years.

FIG. 1 gives examples of these biometrics. On the top-left, a signature 110 is shown and on the top-right a fingerprint impression 130 is shown. The bottom-left shows a voice (print) 120, and the bottom-right an iris pattern 140.

Biometrics can be used for automatic authentication or identification of a (human) subject. Typically, the subject is enrolled by offering a sample biometric when opening, say, a bank account or subscribing to an internet service. From this sample biometric, a template is derived that is stored and used for matching purposes at the time the user wishes to access the account or service. A biometric more or less uniquely determines a person's identity. That is, given a biometric signal, the signal is either associated with one unique person or significantly narrows down the list of people with whom this biometric might be associated. Fingerprints are excellent biometrics, since two people with the same fingerprints have never been found. On the other hand, biometric signals such as weight or shoe size are poor biometrics since these physical characteristics obviously have little discriminatory value.

Biometrics can be divided up into behavioral biometrics and physiological biometrics. Behavioral biometrics include signatures 110 (see FIG. 1) and voice prints 120. Behavioral biometrics depend on a person's physical and mental state and are subject to change, possibly rapid change, over time. Physiological biometrics, on the other hand, are subject to much less variability. For a fingerprint, the basic flow structure of ridges and valleys (cf. fingerprint 130 in FIG. 1) is essentially unchanged over a person's life span. Even if the ridges are abraded away, they will regrow in the same pattern. An example of another physiological biometric is the circular texture of a subject's iris, 140 in FIG. 1. This is believed to be even less variable over a subject's life span. To summarize, there exist behavioral biometrics (e.g., 110 and 120) which are under control of the subjects to a certain extent, as opposed to physiological biometrics whose appearance cannot be influenced (the iris 140) or can be influenced very little (the fingerprint 130).

Figure 2A:
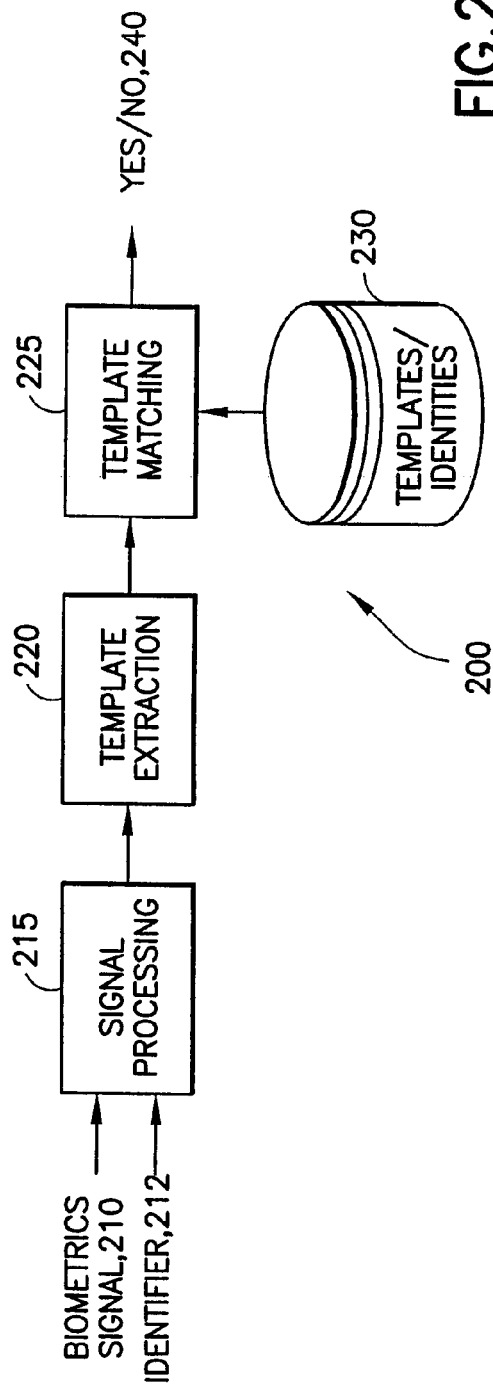
FIG. 2A shows a prior art block diagram of an automated biometrics system for authentication.

Refer now to FIG. 2A. A typical, legacy prior-art automatic fingerprint authentication system has a biometrics signal (say, a fingerprint image) as input 210 to the biometrics matching system. This system consists of three other stages 215, 220 and 225, comprising: signal processing 215 for feature extraction, template generation 220 based on the features, and template matching 225. Along with the biometrics signal 210, an identifier 212 of the subject is input to the matching system. During the template matching stage 225, the template associated with this particular identifier is retrieved from some database of templates 230 indexed by identities (identifiers). If there is a Match/No Match between the template extracted in stage 220 and the retrieved template from database 230, a corresponding 'Yes/No' 240 answer is the output of the matching system. Matching is typically based on a similarity measure: if the measure is significantly large, the answer is 'Yes,' otherwise the answer is 'No.' The following reference describes examples of the state of the prior art:

N. K. Ratha, S. Chen and A. K. Jain, "Adaptive flow orientation based feature extraction in fingerprint images", Pattern Recognition, vol. 28, no. 11, pp. 1657–1672, November 1995.

This reference is incorporated herein by reference in its entirety.

Note that system 200 is not limited to fingerprint authentication, this system architecture is valid for any biometric. The biometric signal 210 that is input to the system can be acquired either local with the matching application on the client, or remotely with the matching application running on some server. Hence architecture 200 applies to all types of biometrics and to both networked and non-networked applications.

Figure 2B:
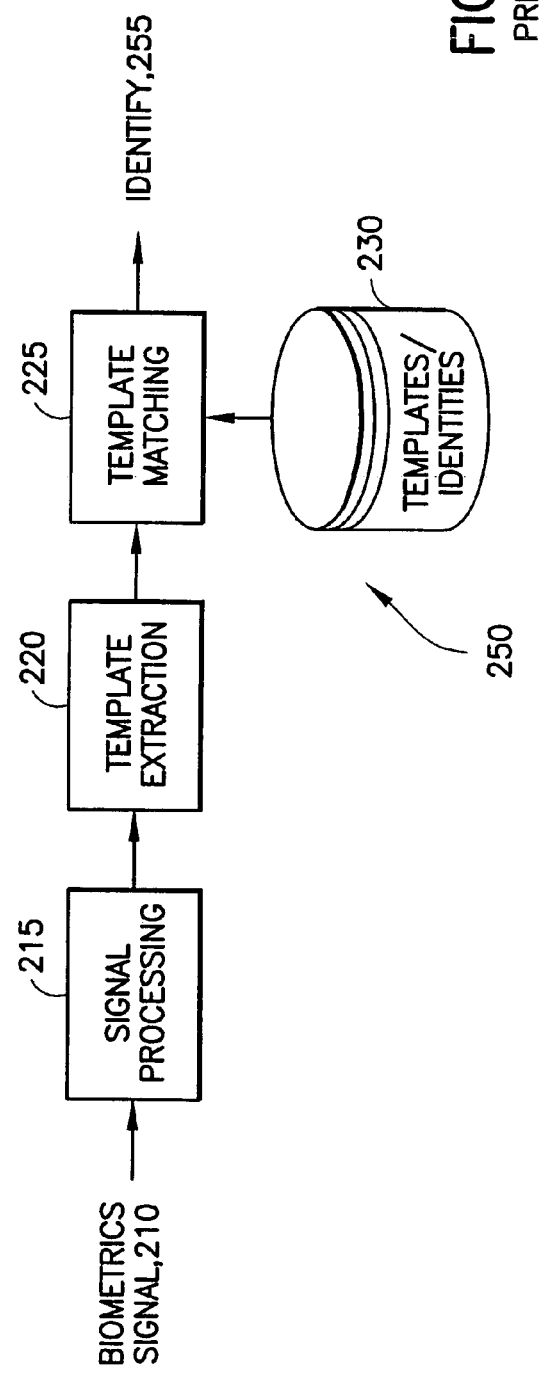
FIG. 2B shows a prior art block diagram of an automated biometrics system for identification.

System 250 in FIG. 2B is similar to system 200 in FIG. 2A, but it is an identification system instead of an authentication system A typical, legacy prior-art automatic biometrics signal identification system takes only a biometric signal 210 as input (FIG. 2A). Again, the system consists again of three stages 215, 220 and 225, comprising: signal processing 215 for feature extraction, template generation 220 based on the features, and template matching 225. During the template matching stage 225, the extracted template is matched to all <template, identifier> pairs stored in database 230. If there exists a good match between the template extracted in stage 220 and a template associated with some identity in database 230, this associated identity is output as the result 255 of the identification system 250. If no match can be found in database 230, the output identity 255 could be set to NIL. Again, the biometric signal 210 can be acquired either locally on a client machine, or remotely with the matching application running on some server. Hence architecture 250 applies equally to networked or non-networked applications.

Automated biometrics in essence amounts to signal processing of a biometrics signal 210 to extract features 215. A biometrics signal is some nearly unique characteristic of a person. A feature is a subcharacteristic of the overall signal, such as a ridge bifurcation in a fingerprint or the appearance of the left eye in a face image. Based on these features, a more compact template representation is typically constructed 220. Such templates are used for matching or comparing 225 with other similarly acquired and processed biometric signals. In this invention we are concerned with biometrics signals and biometrics templates but not with template matching. As described below, it is the process of obtaining templates from biometrics signals that is slightly different when cancelable biometrics are used.

Figure 3A:
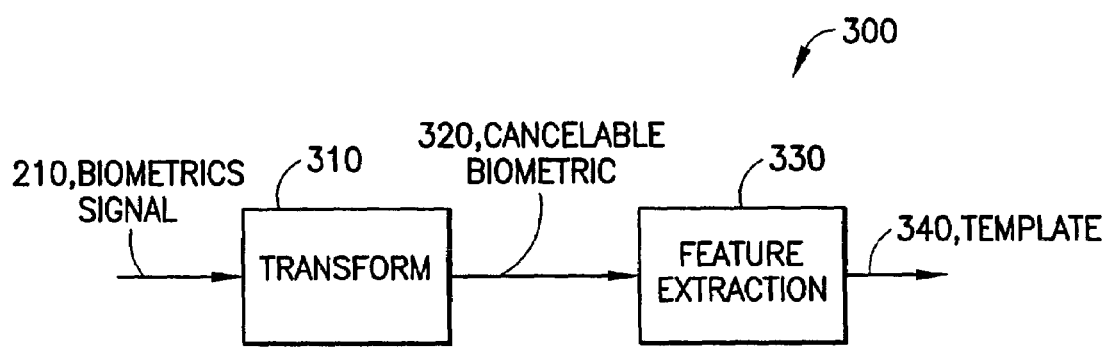
FIG. 3A shows a system where the biometric signal is first distorted and then the template is extracted.
Figure 3B:
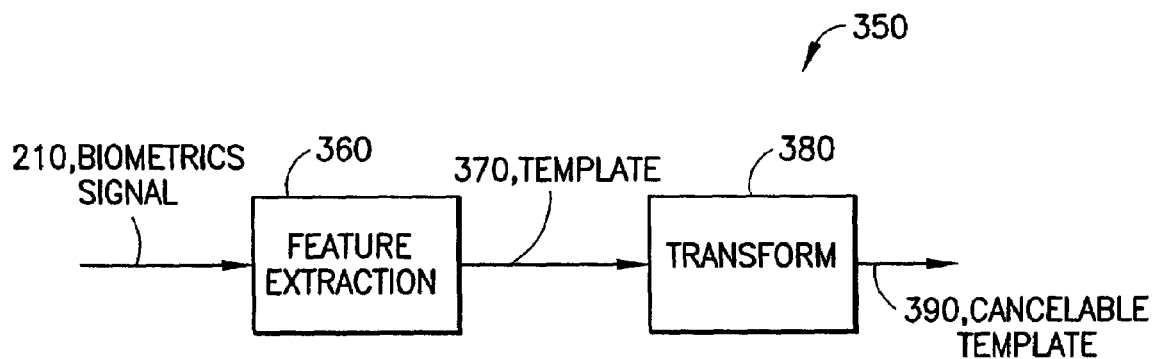
FIG. 3B shows a system where a template is first extracted and then intentionally distorted.

FIG. 3 gives flow diagrams of two different ways a cancelable biometric can be constructed from a biometrics signal 210. In system 300 (FIG. 3A), the biometrics is distorted with transformation 310 to obtain a cancelable biometric 320. Signal processing for feature extraction 330 is then used to obtain a template 340. As described previously, this template is a compact machine representation which is used for matching purposes. By contrast, in system 350 (FIG. 3B) first feature extraction 360 (signal processing) is performed to produce a more compact representation. Next a template 370 is extracted and then, finally, a cancelable distortion transformation 380 is used to construct a distorted template 390.

We refer to both approaches as cancelable biometrics because, from the application viewpoint, it makes no difference how the cancelability is introduced. The important point in both implementations is that different distortions can be chosen for different people, or for the same person at different times. Furthermore, it is important that these distortions are reproducible so that a similar result is obtained each time the biometrics signal from the same person is processed. In the discussion to follow, various methods 380 are described for obtaining suitably distorted biometric signals and distorted biometric templates.

Figure 4:
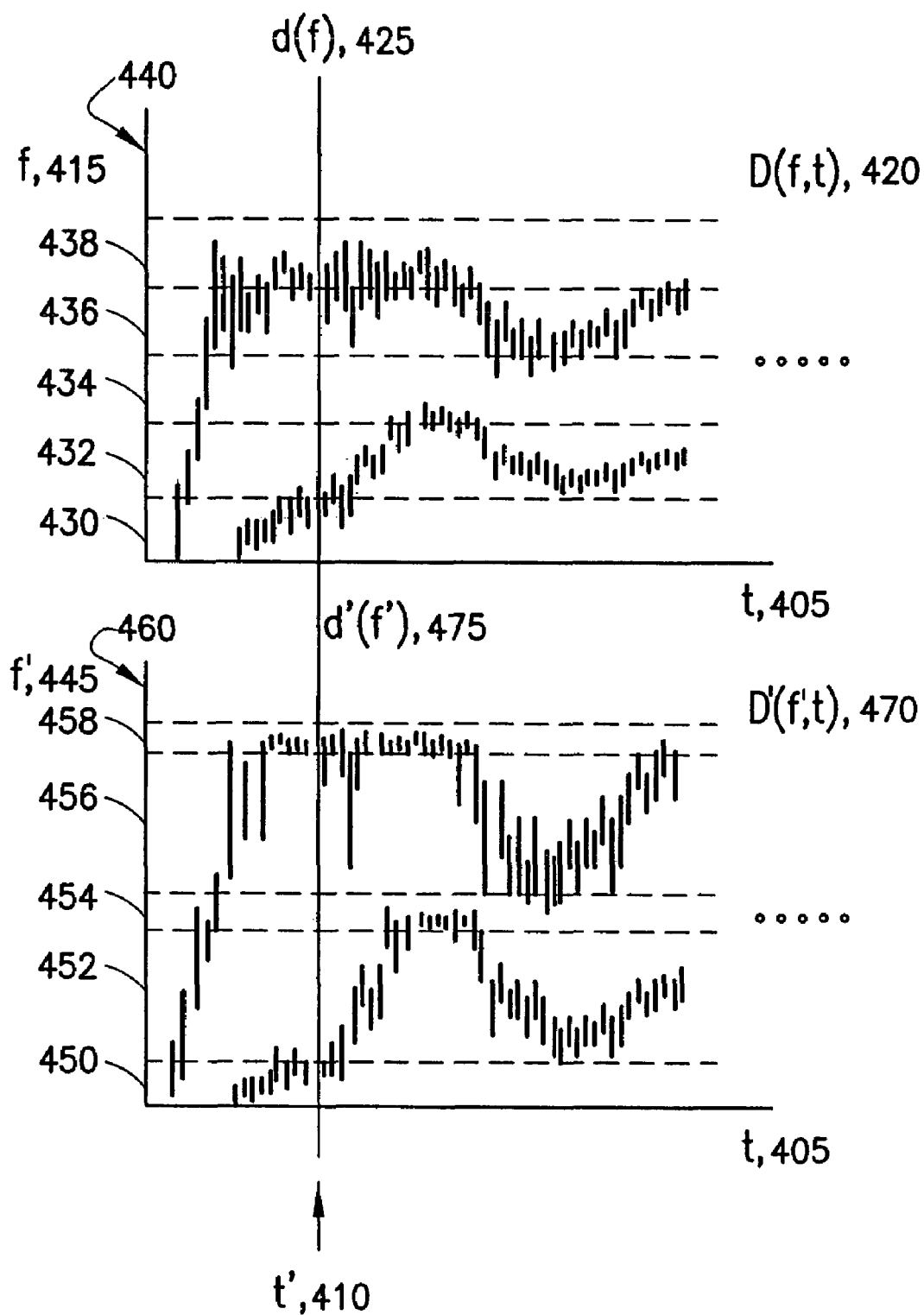
FIG. 4 is an example of a cancelable distortion of a voice biometrics where the voice frequency content is intentionally distorted in the frequency domain.

FIG. 4 gives an example of a cancelable distortion of a speech signal or voice print. The speech signal is a function s(t) of time t. At any time t' 410, s(t') is composed of a number of frequencies f that can be computed using prior art techniques such as a short-time Fourier transform (STFT) of the speech signal. That is, at any time t', there is a distribution d(f) 425 of frequencies. This distribution can be denoted D(f, t'), with t' fixed. Letting t' vary, the speech signal can then be characterized as a two-dimensional function D(f, t) 420 of frequency and time, where D(f, t) gives the amplitude of frequency f at time t. We assume that the structure of the underlying voice print D(f, t) is the same or similar for enrollment and authentication of a subject Such a signal can be transformed by transforming each one-dimensional frequency distribution function D(f, t')=d (f) 425 in some fashion. In FIG. 4, this transformation is the same for each instant of time t' 410. The transformation is accomplished by partitioning the frequency axis 440 into a number of intervals, 430, 432, . . . , 438. The frequency content of each of these intervals is then mapped into a different partitioning 450, 452, . . . , 458 along axis 460. This axis represents transformed frequencies f' 445. For interval 450, the instantaneous transformed frequency distribution function d'(f') 475 is equal to d(h(f)). That is, the interval mapping functions f'=h(f) is applied to d(f) 425, the original frequency distribution function. Hence, for each instant of time t' the signal D(f, t') in 430 is mapped into a new signal D'(f', t') in 450. This is done by mapping the frequency content D(f, t') in interval 432 into interval 452 in D'(f', t') and so on. Thus, in this example the frequency axis is non-linearly stretched.

The resultant voice print D'(f', t) 470 is a cancelable transformation of the original voice print D(f, t) 420. It is cancelable because a different stretching of the various frequency bins can be applied. The resultant speech D'(f', t) will not sound like the original speech D(f, t) of the person who is to be recognized. However, if the person enrolls in the system with distorted voice print D'(f', t), the system should be able to recognize the person based on a submitted voice print provided it is distorted in the same way as the enrollment samples. Note that only the distorted voice print is available to the recognition engine, not the original D(f,t). This enhances privacy. Furthermore, if the transformation h(f) is compromised, a new transformation g(f) similar to h(f) can be assigned to the person (the person would have to re-enroll, however).

Figure 5:
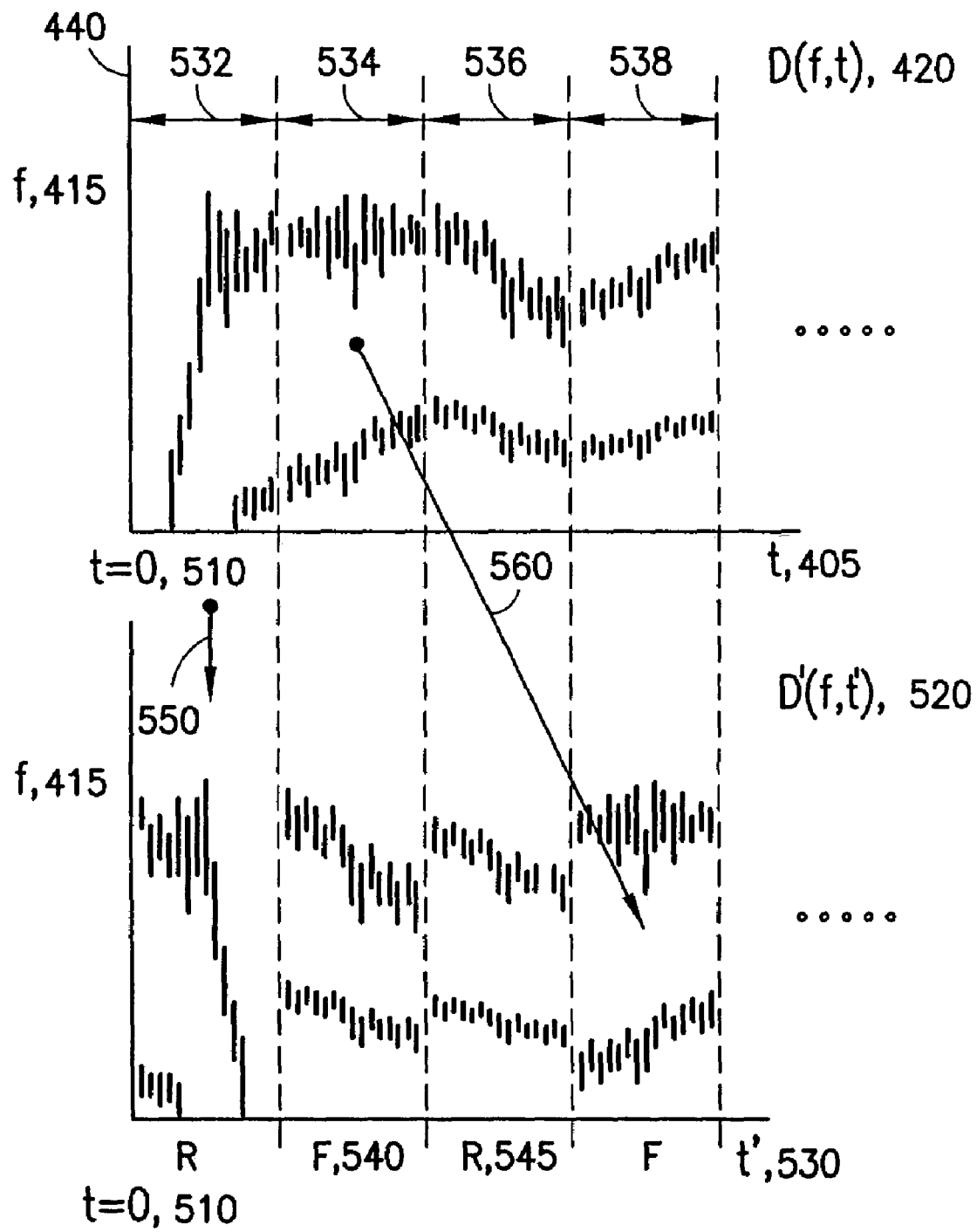
FIG. 5 is an example of a cancelable distortion of a voice biometrics where the voice frequency content is intentionally scrambled in the time domain.

FIG. 5 shows another example of a cancelable distortion transformation of a voice biometric where, this time, frequency content is remapped in the time domain rather than in the frequency domain. Again, the voice print D(f, t) 420 describes the frequency content of the signal at any time 405 (t) as a function of frequency 415 (f). Again, it is assumed that the voice print D(f, t) is the same or similar for enrollment and authentication of a subject. Hence, the voice print is some pass phrase or sentence that starts at time t=0, 510. In this example, it is the time domain which is partitioned in a number of intervals, 530, 532, 534, 536, . . . The transformed voice print D'(f, t') 520 as a function of t' 530 is then constructed by mapping the frequency content in each time interval of D(f, t) into some time interval of D'(f, t') according to a selected permutation of the intervals. Here the content of D(f, t) can either be played forward 'F' 540, or in reverse 'R' 545. In FIG. 5, interval 532 of D(f, t) is mapped 550 to interval 532 of D'(f, t') and reversed, while interval 534 of D(f, t) is mapped 560 into interval 538 of D'(f, t') in the forward fashion. The result is that the pass phrase D'(f, t') is scrambled in such a fashion that the identity of the subject cannot be determined by humans or automated voice recognition systems based solely on the non-scrambled D(f,t). This intentionally distorted biometric could be canceled by specifying a different permutation of time bins for the user (again, the user would have to re-enroll).

Figure 6:
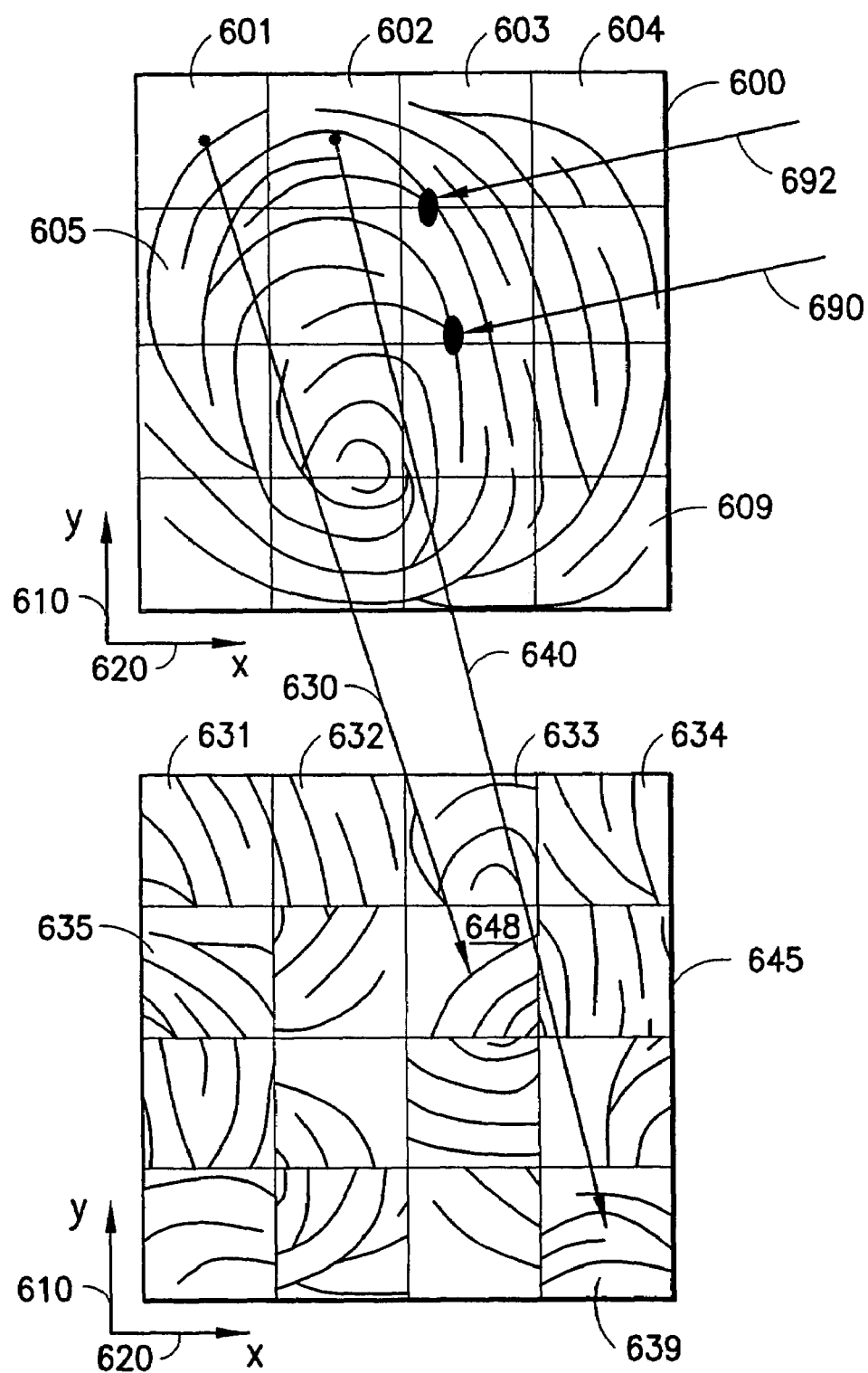
FIG. 6 is an example of a cancelable distortion of a fingerprint biometrics where the fingerprint flow pattern is transformed in the spatial domain.

FIG. 6 is an example of a cancelable distortion transformation of a fingerprint biometric where the fingerprint image is transformed in the spatial domain. A fingerprint intensity image 600 can be considered a function of x (620) and y (610), namely I(x, y). The image is defined on a finite square or rectangle 600. The cancelable fingerprint biometric signal is defined on a similar square or rectangle 645. To construct this cancelable distortion transformation of I(x, y), the image domain is divided into smaller rectangles 601, 602, 603, 604, 605, ..., 609. Similarly, the cancelable image domain is divided into similar rectangles 631, 632, 633, 634, 635, ..., 639. The rectangles of the cancelable image are then filled with a permutation of the rectangles 601, 602, 603, 604, 605, ..., 609 of I(x, y). For example, rectangle 601 of 600 is mapped into rectangle 648 of 645 as indicated by arrow 630, and rectangle 602 of 600 is mapped into rectangle 639 of 645 as indicated by arrow 640. Optionally, the rectangles can also be rotated by 90, 180 or 270 degrees.

Figure 8:
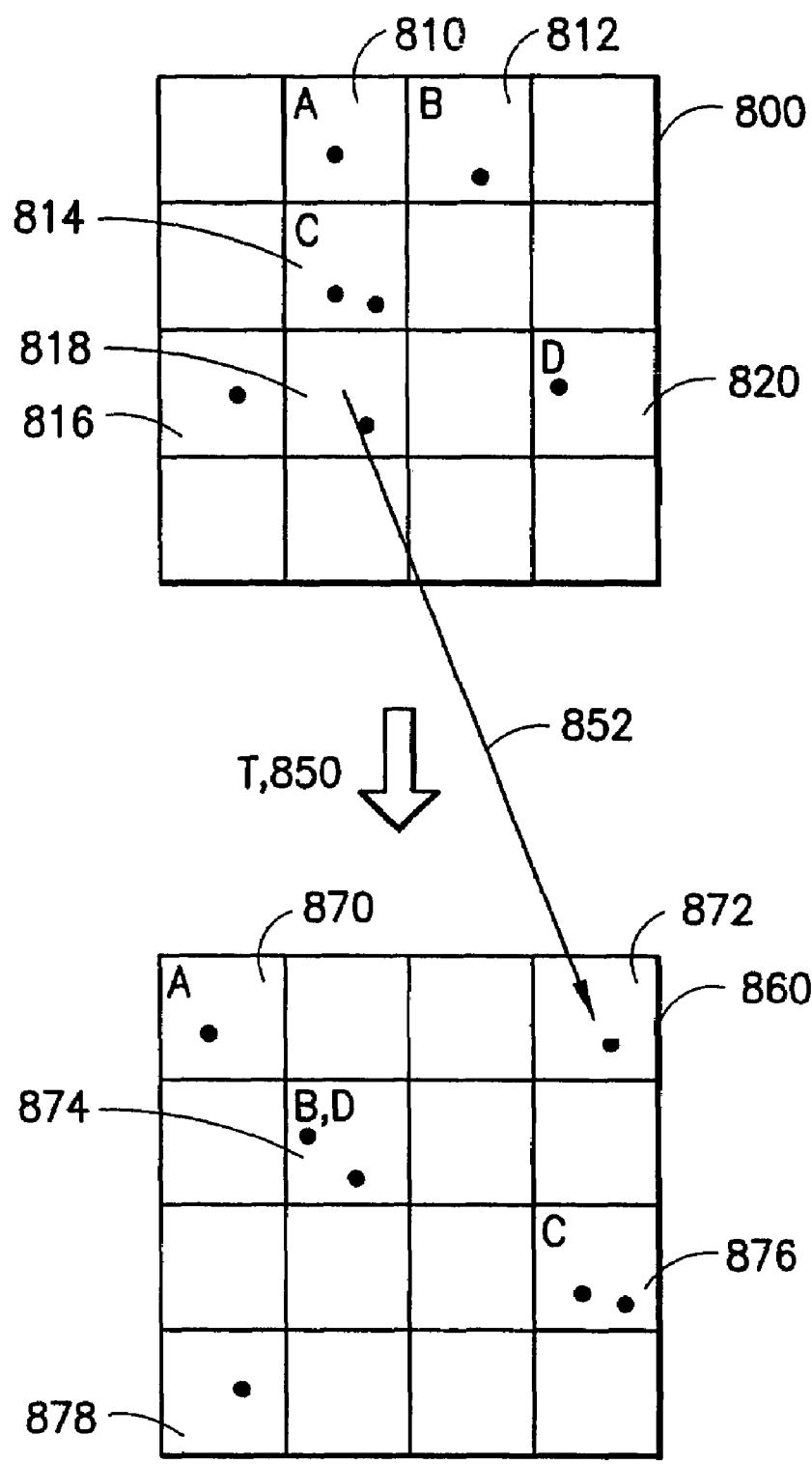
FIG. 8 is an example of a cancelable distortion of a biometrics point set in which a non-invertible transformation is applied in the spatial domain, where the point set can be the set of minutiae in a fingerprint image.

Distorting the fingerprint image function I(x,y) as described introduces many discontinuities in the image at the boundaries of the rectangles. These may well be interpreted as ridge endings and hence will tend to introduce artificial features. Therefore, rather than transforming the image itself, the features (minutiae) such as 690 and 692 extracted from image function could be transformed instead. FIG. 8 shows the basic idea. The rectangles containing the features are translated and rotated according to some permutation between the rectangles in the original image 800 and the rectangles in 860. Such a permutation or scrambling does not generate any spurious artifacts.

Another way to avoid discontinuities and make the fingerprint still look somewhat like a normal fingerprint, is to apply a morph rather than a scramble to the image. One could lay down a polar coordinate grid on the finger similar to that used for the iris in FIGS. 10A and 10B. The grid would be constructed so it was centered at the "core" point 684 (see FIG. 6A) of the finger, and had the line of zero degrees pass through the "delta" point 686. The intersections of the radial lines and the circumferential rings would then be individually perturbed to remap the image portion associated with the corresponding sector. The resultant cancelable fingerprint image then will still look like a fingerprint image, in that it has properties of fingerprint images such as continuous ridge flows and structures around some center point like the core 684. Hence, cancelable fingerprints can be enrolled along with non-transformed fingerprints in the same legacy authentication systems.

Figure 6A:
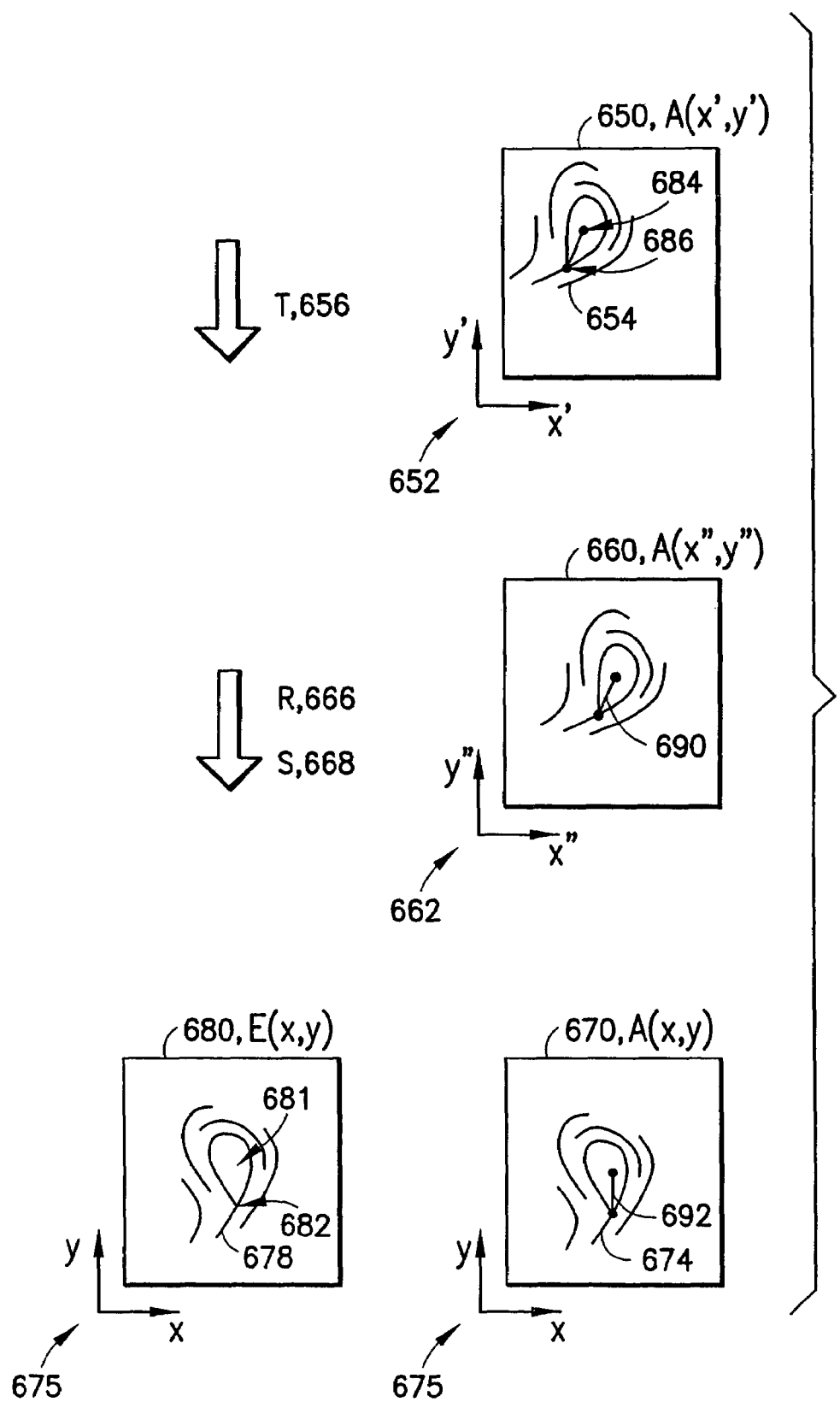
FIG. 6A shows the process of geometrically registering the authentication fingerprint in order to place it in a canonical pose.

FIG. 6A illustrates the process of registering the enrolled fingerprint image E and authentication fingerprint image A. This needs to be done somehow every time the distortion transformation is applied during authentication or else the result will not be similar to the distorted biometric saved during enrollment. For voice prints this was not a problem because both frequency and time are absolute dimensions, with well-defined origins and scales.

For fingerprints the problem is to register authentication image A(x', y') 650 with image E(x, y) 680 that was used for enrollment. That is, the ridge and valley pattern 654 embedded in coordinate system 652 has to be registered as well as possible with pattern 678 embedded in coordinate system 675. In general, a rigid linear mapping from points (x', y') to points (x, y) needs to be found. This can be achieved as a two-step process by first finding a translation T 656 followed by a rotation R 666. The translation T maps the pattern 654 in A(x', y') 650 from coordinate system 652 into A(x", y") 660 in coordinate system 662. Let $(x', y')^t = X'$ and similarly $(x", y")^t = X"$, then $X" = X' + T$ where T is the translation vector. The rotation R 666 (or possibly skew S 668) further maps the translated pattern in A(x", y") 660 from coordinate system 662 to A(x, y) 670 in coordinate system 675. Again, letting $(x", y")^t = X"$ and $(x, y)^t = X$, we can write $X = R\, X"$ where R is the rotation matrix. The result is pattern 674 in image 670 embedded in coordinate system 675. After these manipulations, the patterns 678 in the enrolled image 680, and 674 in the aligned authentication image 670, are registered as well as possible.

One way to obtain the transformation between pattern 654 and 678 (see FIG. 6A) is by locating special points which appear in most fingerprint pattern. One can thus extract the "core" 681 and "delta" 682 from the fingerprint image, and then transform the image to put these in some canonical position in enrollment image E(x, y) 680. In 680 this is achieved by forcing the midpoint between the core and delta to be in the center of the image, and then rotating the whole image so that the line containing the core and delta points is parallel to the y axis. For the authentication image A(x', y') 650 the same procedure is used. That is, in the image 650 the core 684 and the delta 686 are extracted. The midpoint of the line segment connecting the core and delta is translated with T 656 to the center 690 of the intermediate image A(x", y") 660. The line segment is then rotated with rotation matrix R 666 to be parallel to the y axis 692.

This is just one possible method to achieve alignment. Other characteristic features of fingerprint images, such as the center and orientation of the ellipse that bounds the fingertip image, could be used to align the enrolled and presented fingerprint images. A similar method is to use the first and second-order moments of the fingerprint images. These moments can be interpreted as defining equivalent ellipses and can be used in the same fashion as above. Still another method would be save a private copy of the original enrollment image 650, then directly align each authentication image 670 with it using some overall matching function before applying the specified distortion to the authentication image. The private copy of the original enrollment image might be stored in a device which remains in the possession of the user (such as a smartcard) in order to guard against exposure of the user's actual biometric.

Figure 7:
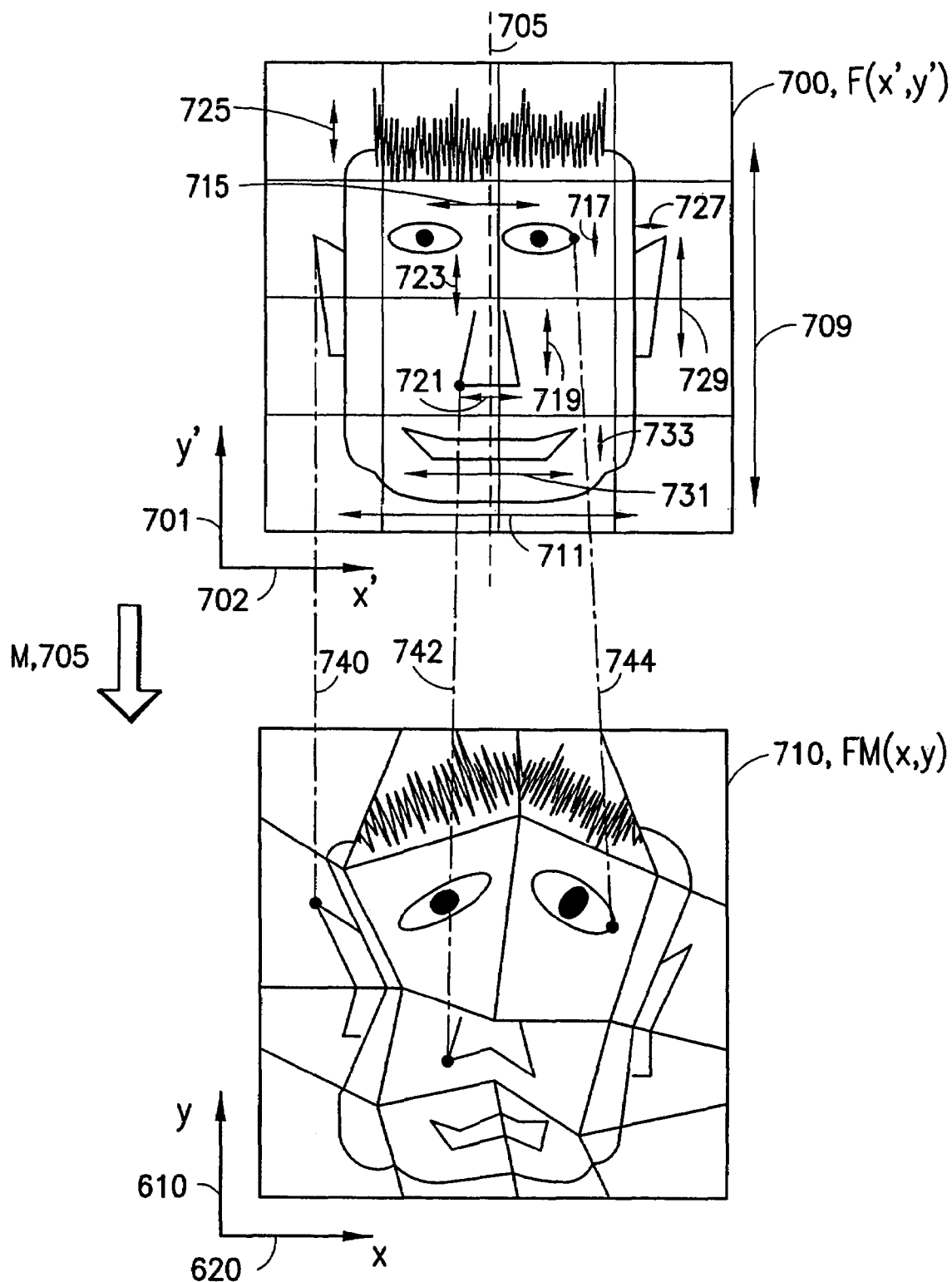
FIG. 7 is an example of a cancelable distortion of a face biometrics where the face appearance is transformed in the spatial domain.

FIG. 7 is an example of a cancelable distortion transformation of a face biometrics where the face appearance is transformed in the spatial domain. The biometrics signal (a face image) is shown in image F(x', y') 700, while the transformed cancelable biometrics (a morphed face image) is shown in image FM(x, y) 710. The morphing transformation is denoted by M 705. The original face image F(x', y') is defined in a coordinate system with axes x' 702 and y' 701. The cancelable morphed face image FM(x, y) is defined in terms of a different coordinate system consisting of x 620 and y 610. As indicated by the arrows 740, 742 and 744, each image point FM(x, y) is mapped to some other point in F(x', y')=F(f(x,y), g(x,y)) using the coordinate change functions f(x,y) and g(x,y), which can be quite complicated.

If there is no control over, or no knowledge of the back-end face recognition engine, then the morphed face image FM(x, y) 710 needs to look like a plausible face. This is because all face recognition systems are designed with actual facial feature constraints in mind. So, unlike the morphed face image shown in FIG. 7, the morphed face should be symmetrical. That is, the symmetry with respect to the axis 705 should be preserved. This restriction still allows things like the height 709 of the face to be changed. The distance 715 between the eyes, and the nose parameters 719 and 721 could also be changed directly. The hairline properties may be changed by simply varying 725 or other overall properties of the hairline. The width of the face 711 could also be changed if, for instance, the change varies according to some continuous function along the axis of symmetry 705. Similarly, the size of the eyes 717 may be changed, typically provided that both eyes end up the same size. The same applies to the ear parameters 727 and 729, and the mouth parameters 731 and 733; they may be changed as long as approximate symmetry is preserved. Note that these paired changes may be nonlinear, i.e., the ear width 727 may be changed according to a continuous function along the ear height or vice versa.

Figure 7A:
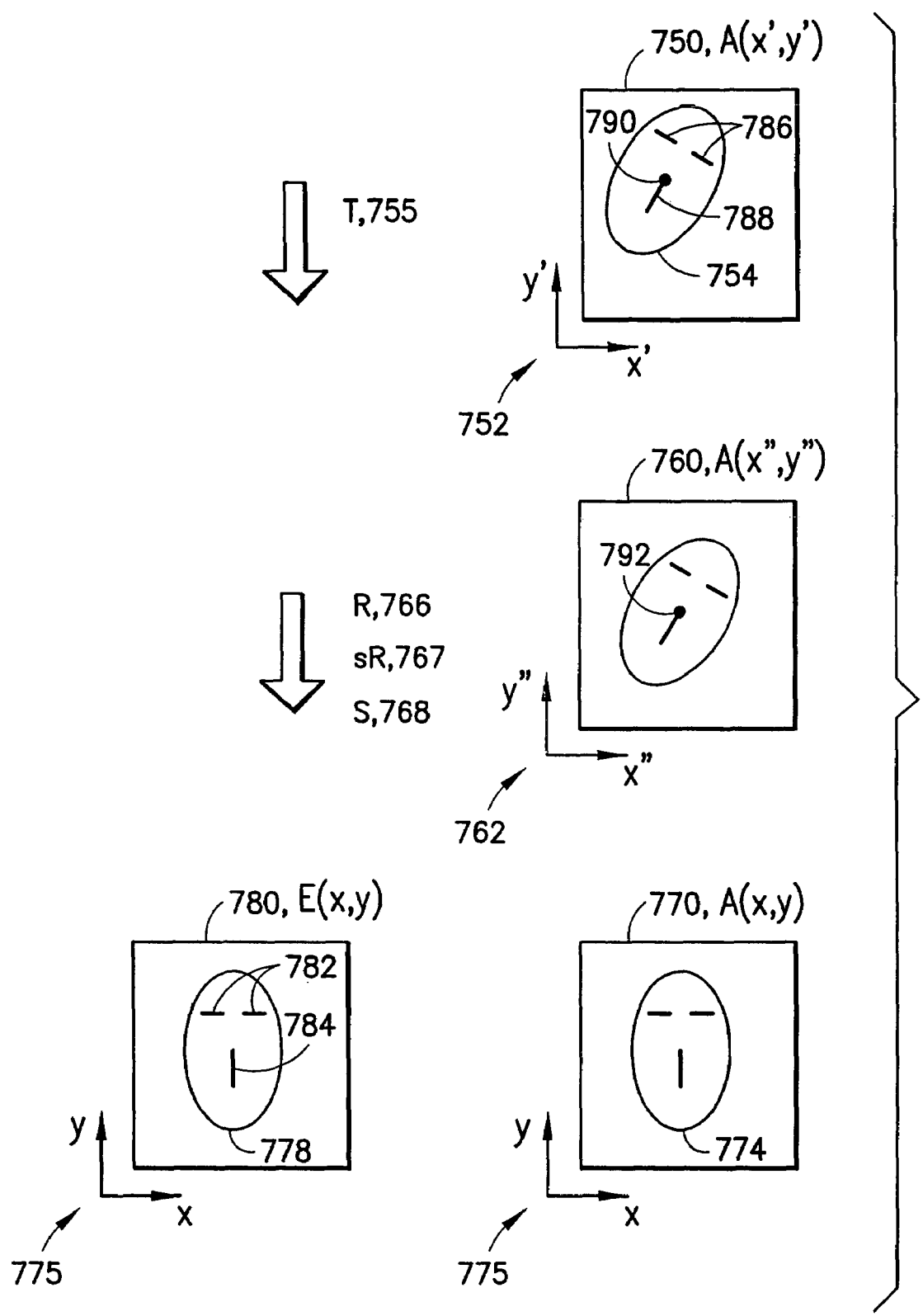
FIG. 7A shows the process of geometrically registering the authentication face image in order to normalize it to a canonical pose and standard size.

As with the fingerprints, the enrolled face image E and authentication face image A need to be registered somehow every time authentication is requested. FIG. 7A shows the process of registering the authentication face image A(x', y') 750 with the enrolled face image E(x, y) 780. The basic idea is to adjust each of the images so it is in a known reference position and of some standard size, and then compare these canonical views. Here the face pattern 754, which is embedded in coordinate system 752, has to be registered as well as possible with face pattern 778, which is in coordinate system 775. This can be achieved with a linear mapping from points (x', y') to points (x, y). Again, as in FIG. 6A such a mapping can generally be broken down into a translation T 755 followed by either a rotation R 766, a rotation and a scaling sR 767, or a combined skewing S 768. The parameters of these transformations may be derived by first detecting characteristic face features in the enrollment image E(x, y) 780. In this case, the eyes 782 and nose 784 are detected and registered. Then enrolled face is put in some canonical form, say by aligning the nose 784 with the y axis and translating the image so that the center of mass of the eyes and nose are in the center of the image E(x, y) 780.

In the authentication face image A(x', y') 750, the same features 786 (eyes) and 788 (nose) are detected in face pattern 754. The center of mass 790 of these features is computed from which the translation T 755 can be derived as the vector connecting this point to the center of the image 750. This translation T 755 maps the face 754 in A(x', y') 750 from coordinate system 752 to A(x'', y'') 760 in coordinate system 762. This can be written in a more compact mathematical form by letting $(x', y')^t = X'$ and $(x'', y'')^t = X''$, then $X' = X'' + T$. In the next step, the rotation R 766 or skew S 768 takes the translated face in A(x'', y'') 760 embedded in coordinate system 762 and remaps it to A(x, y) 770 in coordinate system 775. To summarize, with $(x'', y'')^t = X''$ and $(x, y)^t = X$, then $X = R X''$. The final result is face pattern 774 in image 770 which is embedded in coordinate system 775. The faces 778 and 774 in the enrolled image 780 and the aligned authentication image 770, are now registered as well as possible using just rotation and translation. However, since a face may appear at different scale in different images, the system may additionally need to scale face 774. In that case, the transformation is $X = s R X''$ using the scaled rotation transform sR 767. In case the view of the face in either the enrollment image or the authentication image is not frontal, skew S 768 may be used to partial compensate for this effect and map A(x'', y'') 760 to A(x, y) 770. Of course, different facial features from the ones described may be used in the registration process.

An alternate way of obtaining registration transforms is by using of standard, commercially available face recognition engine since these always somehow determine the pose of the face pattern.

FIG. 8 is a more general example of a cancelable distortion transformation of a point set biometrics where the point set is transformed through a non-invertible transformation in the spatial domain. These point features might be things like the minutiae (ridge endings and bifurcations) in a fingerprint image. The spatial constellation of these points, as in block 800, are a representation of the biometrics signal. As in FIG. 6, the overall image 800 is divided into a number of rectangles or squares. The rectangles in 800 that contain feature points are indicated by 810, 812, 814, 816, 818 and 820. The cancelable transformation T 850 maps the feature points into transformed space 860. As with the original space 800, this space 860 is also divided up into rectangles, such as 870, 872 and 874.

Unlike FIG. 6, however, the transformation T 850 is not a strict permutation (in the mathematical sense) of the blocks, but rather a scrambling. Some mappings are distinct: block 818 is mapped 852 onto block 872, block 816 is mapped onto block 878, block 810 is mapped onto block 870 (both indicated by A); and block 814 is mapped onto block 876 (both indicated by C). However, here both block 812 and block 820 are mapped onto block 874. For this reason, block 874 is labeled B, D to indicate it contains data from the blocks labeled B and D in 800. Because multiple blocks from space 800 can be mapped into a single block of space 860, it is impossible to reconstruct the original image 800 from the scrambled one 860. This is because it is impossible to tell, in general, which original block or blocks the two points in block 874 came from. That information has been lost.

Figure 9:
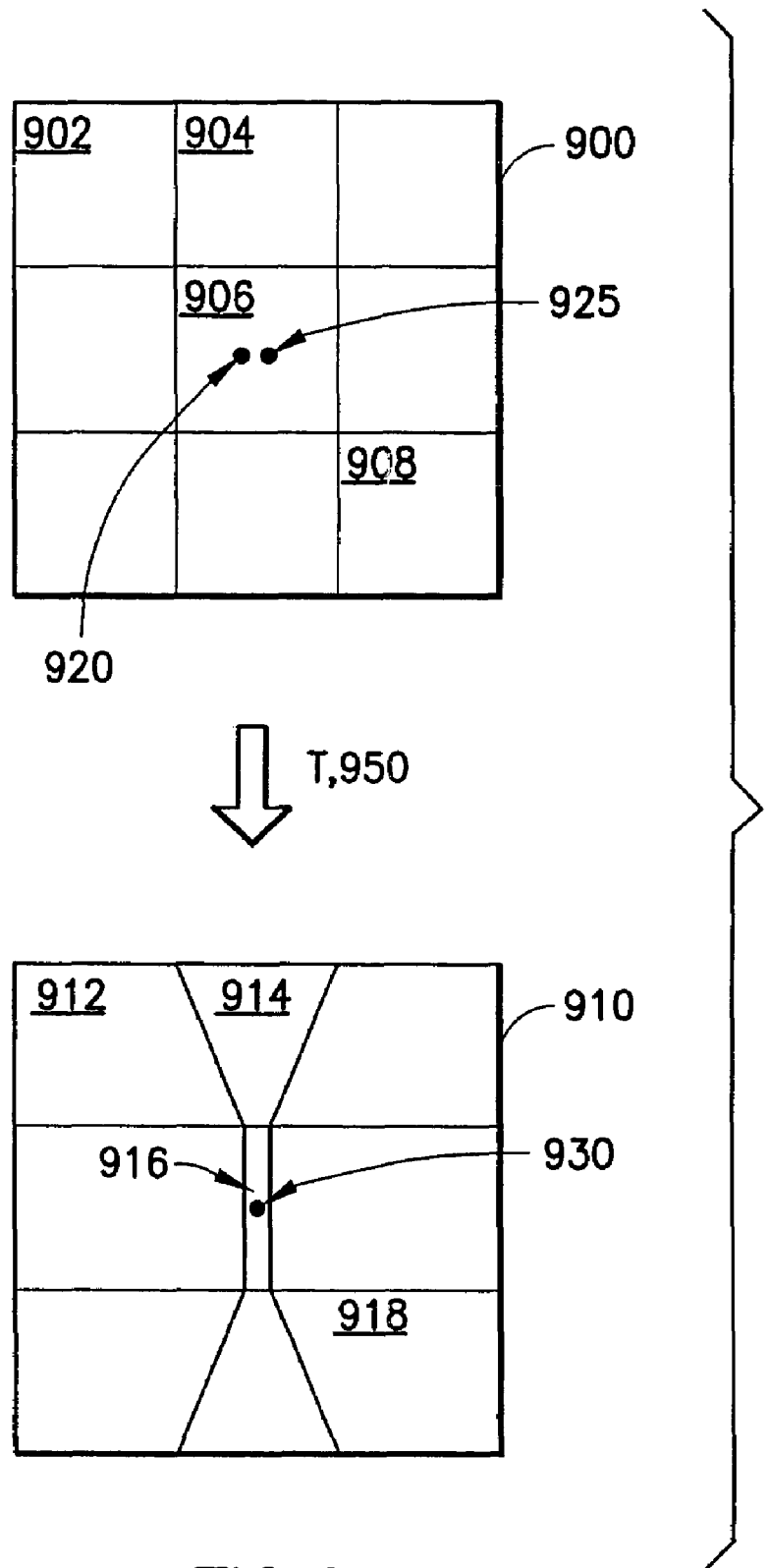
FIG. 9 is another example of a cancelable distortion of a biometrics point set where the point set distorted by applying a spatially variant transformation to a partitioning grid.

FIG. 9 is another example of a cancelable distortion transformation of either a point set or image biometrics, where the point set or image is transformed through a non-invertible morphing transformation. Again, the image or point-set space, represented by block 900 contains some biometrics signal. The biometrics signal can be a continuous image defined in this space or it can be a point-set representation of a biometrics. The block 900 is then divided up into rectangles 902, 904, . . . , 906, . . . 908 each containing some portion of the biometrics signal. As an example, rectangle 906 contains two feature points 920 and 925. The result of transformation 950 is the block 910, which contains the cancelable (distorted) version of this biometrics. Block 910 is divided up in a number of shapes 912, 914, . . . , 916, . . . , 918. The number of shapes in 910 is equal to the number of rectangles in 900. The transformation T 950 morphs the biometrics signal in 900 into 910. That is, each individual rectangle in 900 is mapped to a corresponding shape in 910. For instance, rectangle 902 is mapped onto shape 912, rectangle 904 is mapped onto shape 914, 906 onto 916, 908 onto 918, and so on. The image 910 is then resampled at some fixed spatial quantization (i.e. converted to discrete pixels). For such mapping (morphing) 950 which remains within a similar sized square 910 as the original image 900, it is impossible to guarantee that each point in 900 will map into a single distinguishable point in 910. This is illustrated by examining the fate of points 920 and 925 in rectangle 906. These points are mapped 950 into a single point 930 in shape 916 due to the quantization of the resulting image 910. This means that the transformation T 950 is non-invertible since there is no way after the fact to untangle these two points. While the example has been cast in terms of deforming rectangular patches, areas 902, 904, ..., 906, ..., 908 can be arbitrary shapes that cover 900. Similarly, the shapes 912, 914, ..., 916, ..., 918 can be arbitrary. However, to apply this technique there needs to be a one-to-one correspondence between the shapes in 900 and 910, as well as a principled way of spatially mapping the contents of one shape into the interior of another.

Figure 10A:
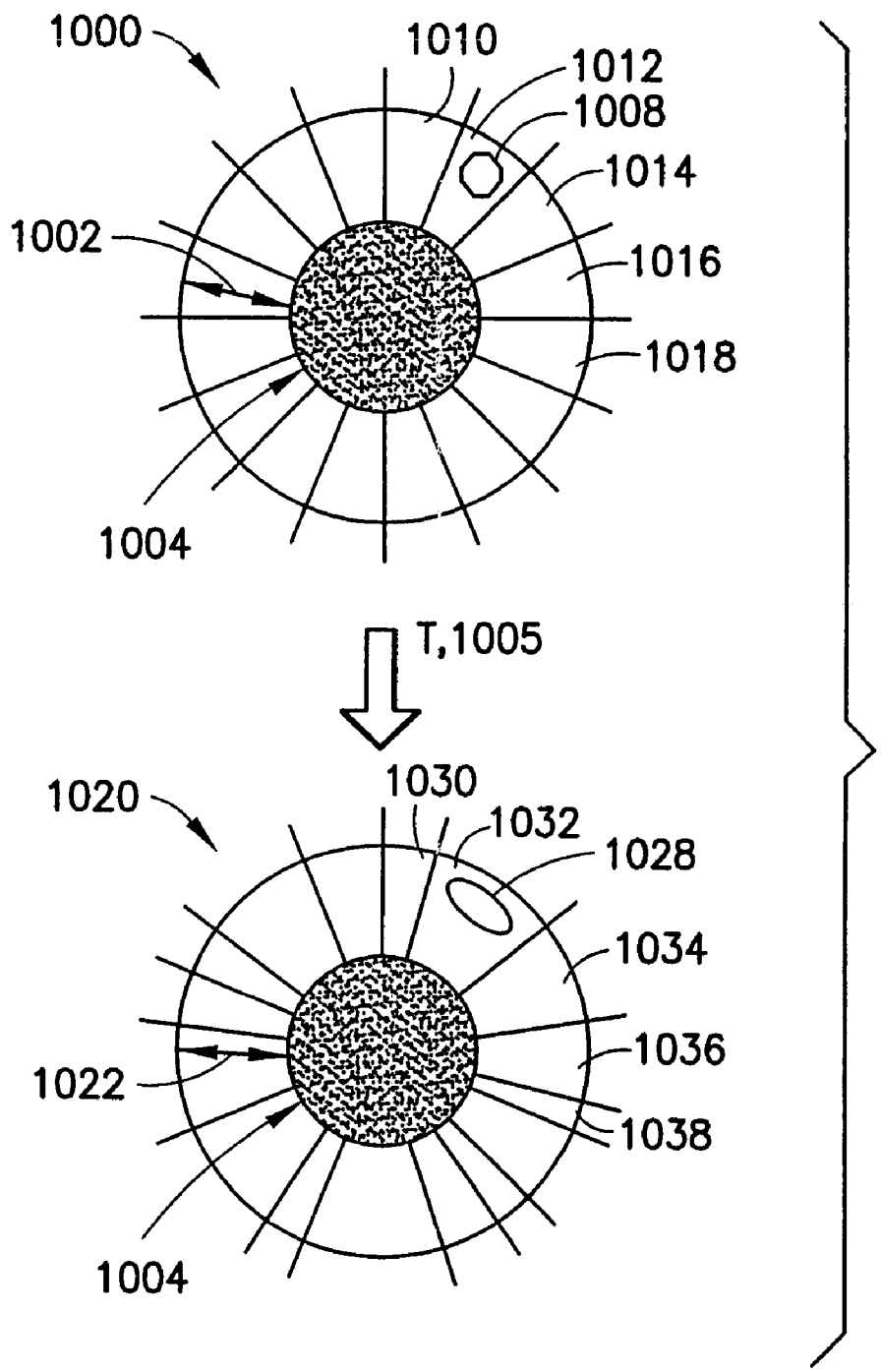
FIG. 10A is an example of a cancelable distortion of an iris biometric where the iris image is transformed in the spatial domain by adjusting the angles in a polar coordinate system.

FIG. 10A is an example of a cancelable transformation of an iris biometrics where the iris image (such as 140 in FIG. 1) is transformed in the spatial domain using the angle of a polar coordinate system. Here the original iris biometrics 1000 has pupil 1004 with the iris area being the colored portion in the concentric ring 1002 around the iris. An angular morphing of the iris may be achieved as follows. The iris area is divided into radial sectors of equal area, such as segments 1000, 1012, 1014, 1016, 1018 and so on. The cancelable distortion transformation T 1005 is a new image 1020 of the eye which still looks like an eye. It is created by dividing the iris area 1022 of image 1020 into a number of angular sectors, this time of unequal size. That is, divisions such as 1030, 1032, 1034, 1036, 1038, etc. The number of angular sectors in 1000 and 1020 is the same. The transformation T 1005 then consist of mapping from each sector in 1000 to the corresponding sector in 1020. That is, the portion of the iris image falling in sector 1010 is mapped onto sector 1030, sector 1012 is mapped onto sector 1032, etc. for all sectors in 1000. This mapping can generally be done by a simple linear stretching or shrinking of the original image fragment, although monotonically increasing or decreasing functions of the angle also may be used. In the case that the transformation is linear, circle 1008 will change into oval 1028. Notice that this distortion creates a transformed image that continues to look like an eye. Note also that it is easy to change the transformation 1005 by simply changing the size of the various sectors used in resulting image 1020.

Figure 10B:
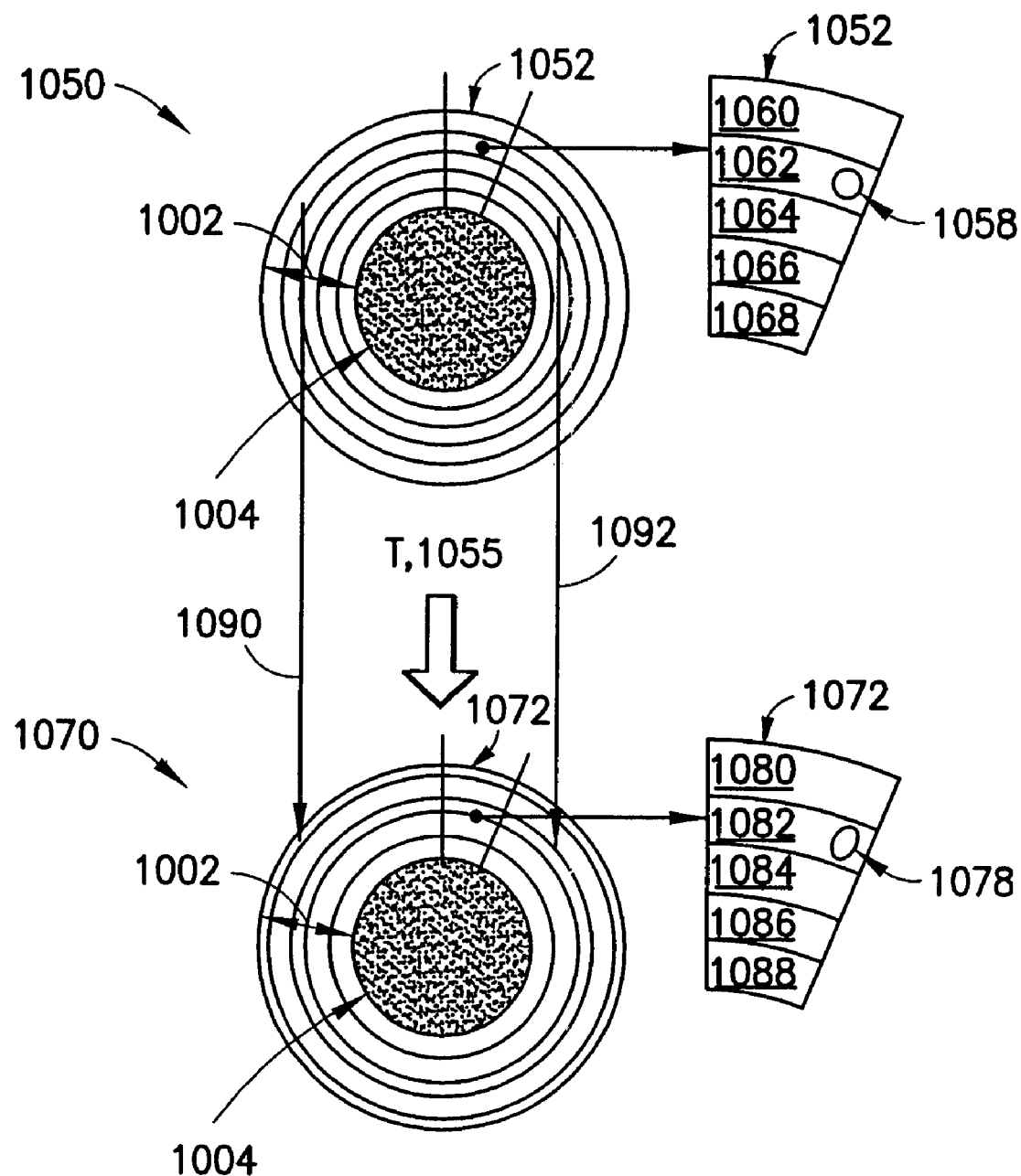
FIG. 10B is another example of a cancelable distortion of an iris biometric where the iris image is transformed in the spatial domain using the radius of a polar coordinate system.

FIG. 10B is another example of a cancelable distortion transformation for an iris image. This the image is again transformed in the spatial domain, but this time using the radius of a polar coordinate system. As before, the original iris biometrics 1000 has pupil 1004 and iris area in the concentric ring 1002 around the pupil. A radial morphing of the iris image may be achieved as follows. As shown in FIG. 10B, the iris area is divided into concentric rings of equal radius. These radial rings are shown in the enlarged segment 1052 and labeled 1060, 1062, 1064, 1066, 1068. The cancelable transformation T 1055 is obtained by constructing a new image 1070 of an eye. The iris area 1002 of this new image 1070 is also divided into radial rings, but now of unequal radius as indicated in enlarged segment 1072 with the rings 1080, 1082, 1084, 1086 and 1088. The number of rings in 1050 and 1070 is the same. The transformation T 1055 of the iris image function is a mapping from each ring in 1050 to the corresponding ring in 1070. That is, ring 1060 is mapped (arrow 1090) onto ring 1080, ring 1062 is mapped onto ring 1082, ring 1064 is mapped (arrow 1092) onto ring 1084, 1066 onto 1086, and 1068 onto 1088. This mapping can be done by simple linear stretching or shrinking of the radius for each ring pair. Monotonous increasing or decreasing functions of the radius also may be used. In the case that the transformation is linear, circle 1058 on FIG. 10B will change into ellipse 1078.

The angular transformation as described in FIG. 10A and the radial transformation of FIG. 10B can optionally be combined in a new composite transformation. If one defines the polar coordinates with radius $\rho$ and angle $\phi$, then the combined transformation is a two-dimensional transformation of $\rho$ and $\phi$. In this case, each ring segment in the original iris biometrics is mapped into ring segment of different radius $\rho$ and angle $\phi$. This is similar to the morphing transformation discussed in relation to FIG. 7, but using annular segments instead of rectangles as the partitioning to be distorted.

No matter which of these method is used to distort an iris image, once again it is necessary to correctly register each image before transformation so that the distortions are repeatable. Such registration is easily achieved by finding the centers of the pupil 1004 and some distinguishing overall orientation, such as the line connecting the corners of the eye. The registration is performed by moving the pupil center to the center of the image, and then rotating the image around this center so that the line between eye corners is horizontal. The iris images can then be expressed in polar coordinates $\rho$, $\phi$. with the center of the pupil at the origin.

Figure 11:
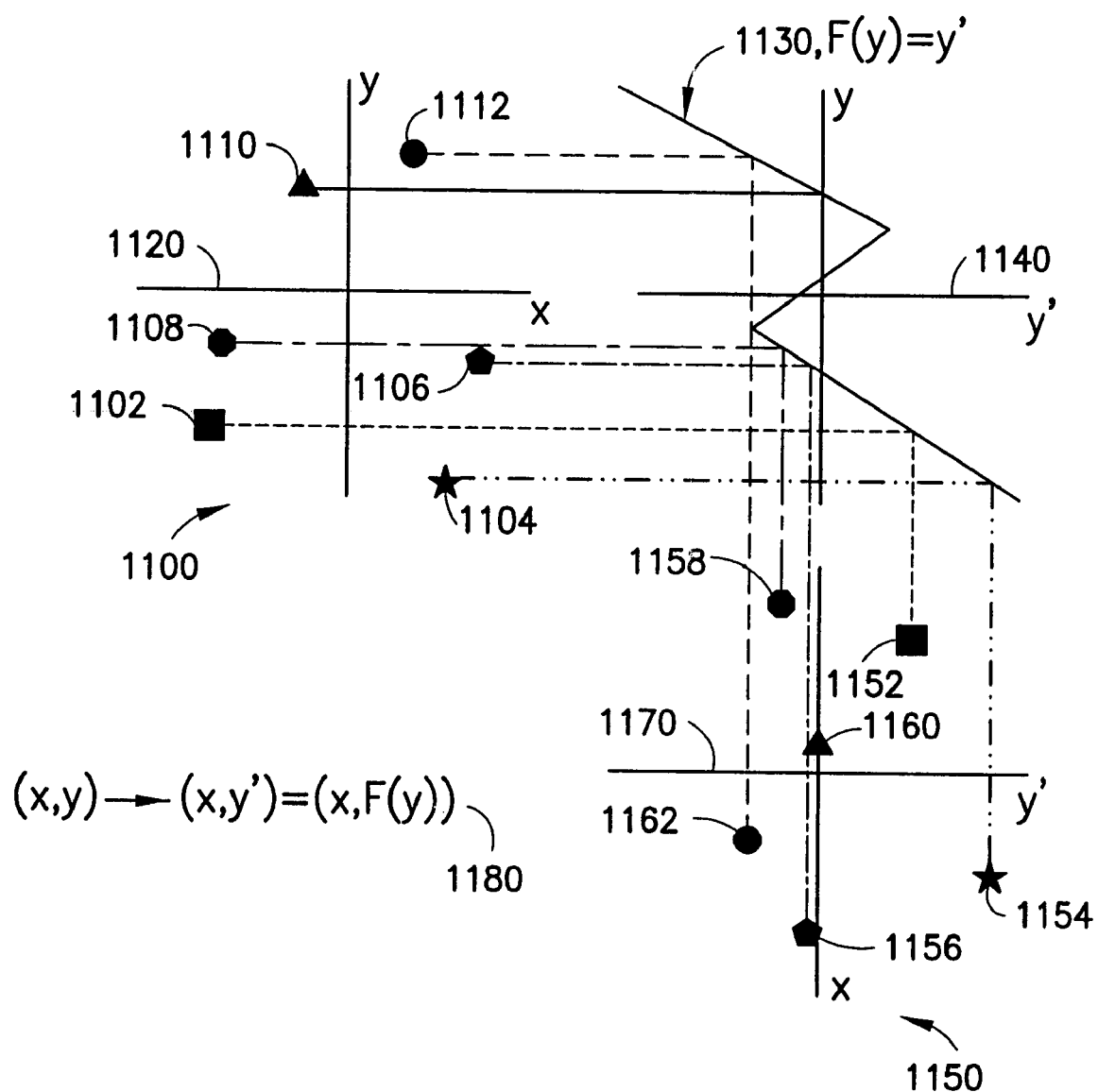
FIG. 11 is a cancelable distortion of a point set biometrics where the point set is directly distorted by applying a non-invertible transformation of one of the coordinates where the point set can be the set of minutiae of a fingerprint image.

FIG. 11 is concerned with point set biometrics (such as fingerprint minutiae) and shows another type of cancelable distortion transformation. In this case the point set is transformed through a non-invertible transformation of one of the coordinates. Example point set 1100 consists of six points: 1102, 1104, 1106, 1108, 1110, 112. These points are embedded in x, y coordinate system 1120. The cancelable transformation, which is non-invertible, is defined as a function F(y)=y' 1130 in the (y, y') coordinate system 1140. The transformation maps the original y coordinate of each point in set 1100 to a new y' using F 1130. The x coordinate is not changed. The original point set 1100 then is thus mapped into the distorted point set 1150 in the (x, y') coordinate system 1170. The transformed points are: 1152, 1154, 1156, 1168, 1160, 1162. That is, point 1102 is mapped onto 1152, 1104 onto 1154, and so on. Mathematically, each point (x, y) is mapped into (x, y')=(x, F(y)) where the function F(y) is non-invertible, meaning there exists no function y=F$^{-1}$(y'). So, given a set of distorted points (x, y'), it is impossible to retrieve the original points (x, y). This protects the privacy of the user's actual biometrics.

Figure 12:
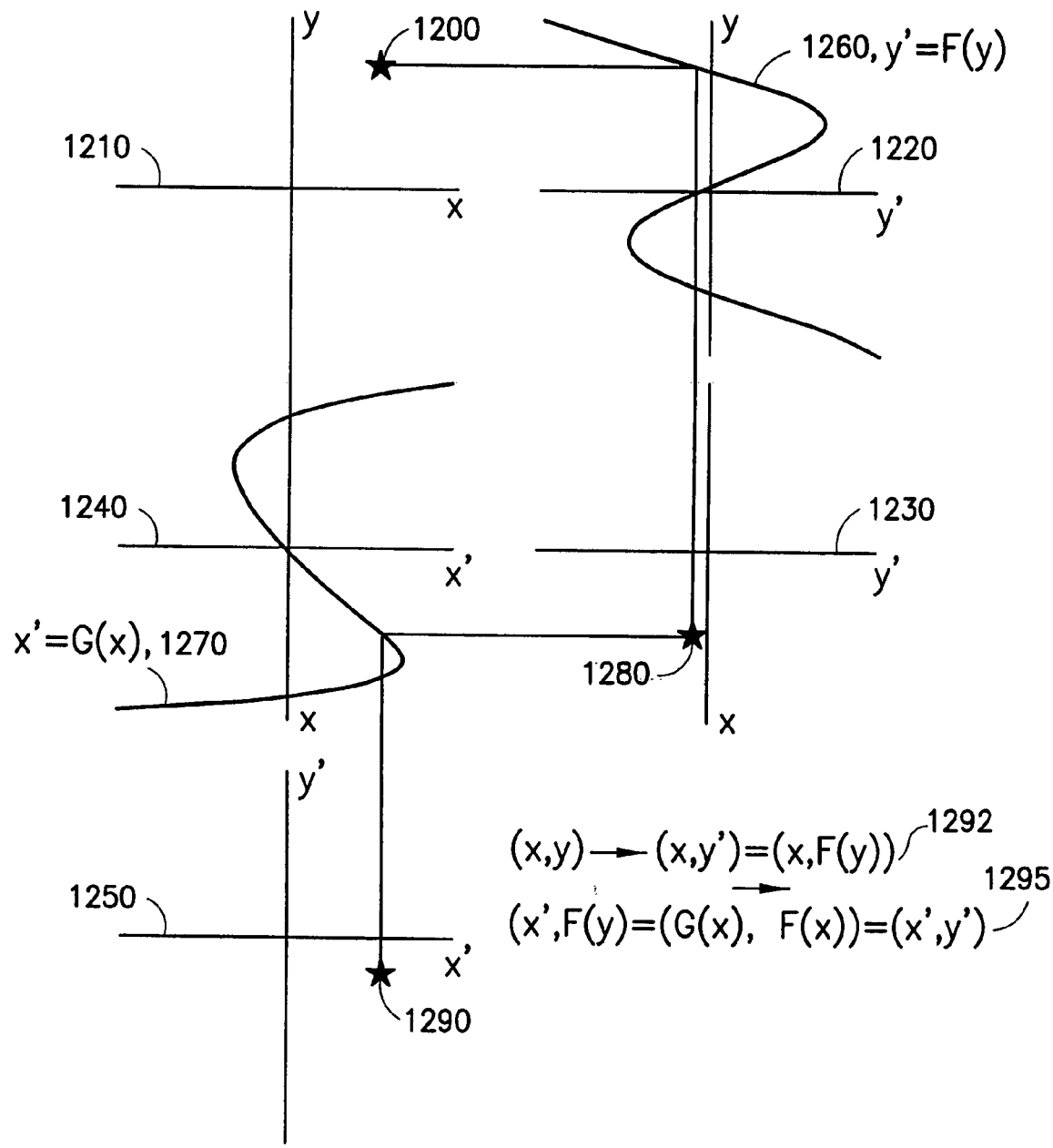
FIG. 12 is a cancelable distortion of a point set biometrics where the point set is distorted through non-invertible transformations of both coordinates.

FIG. 12 is another cancelable distortion transformation of a point set biometrics where the point set is now transformed through non-invertible transformations of both coordinates. Again, the point set lies in (x, y) coordinate system 1210. This point set is transformed through two coordinate transformations into a set in the (x', y') coordinate system 1250. An example mapping is given by point 1200, which is eventually mapped into 1290 in coordinate system 1250. However, first, the y coordinates of the points are all transformed using function y'=F(y) 1269 in (y, y') coordinate system 1220. This is similar to the technique illustrated in FIG. 11. The result is a new set of points in the space spanned by coordinate system (x, y') 1230. Intermediate point 1280, for example, comes from original point 1200. Next, the x coordinates of all the points are transformed using the function x'=G(x) 1270 (defined over the (x, x'). coordinate system 1240). For intermediate point 1280, this results in final point 1290 in (x', y') coordinate system 1250. In mathematical terms, the point (x, y) is mapped into (x, F(y))=(x, y') 1292, and then the point (x, y') is mapped to (G(x), y'))=(x', y'). In general, this transformation results in a scrambled set of points in (x', y') space from which the original set cannot be recovered. This is true provided at least function F 1260 or function G 1270 is non-invertible. The purpose of using multiple functions is to more thoroughly distort the original biometric so that even the distributional statistics of the points are significantly altered.

Figure 13:
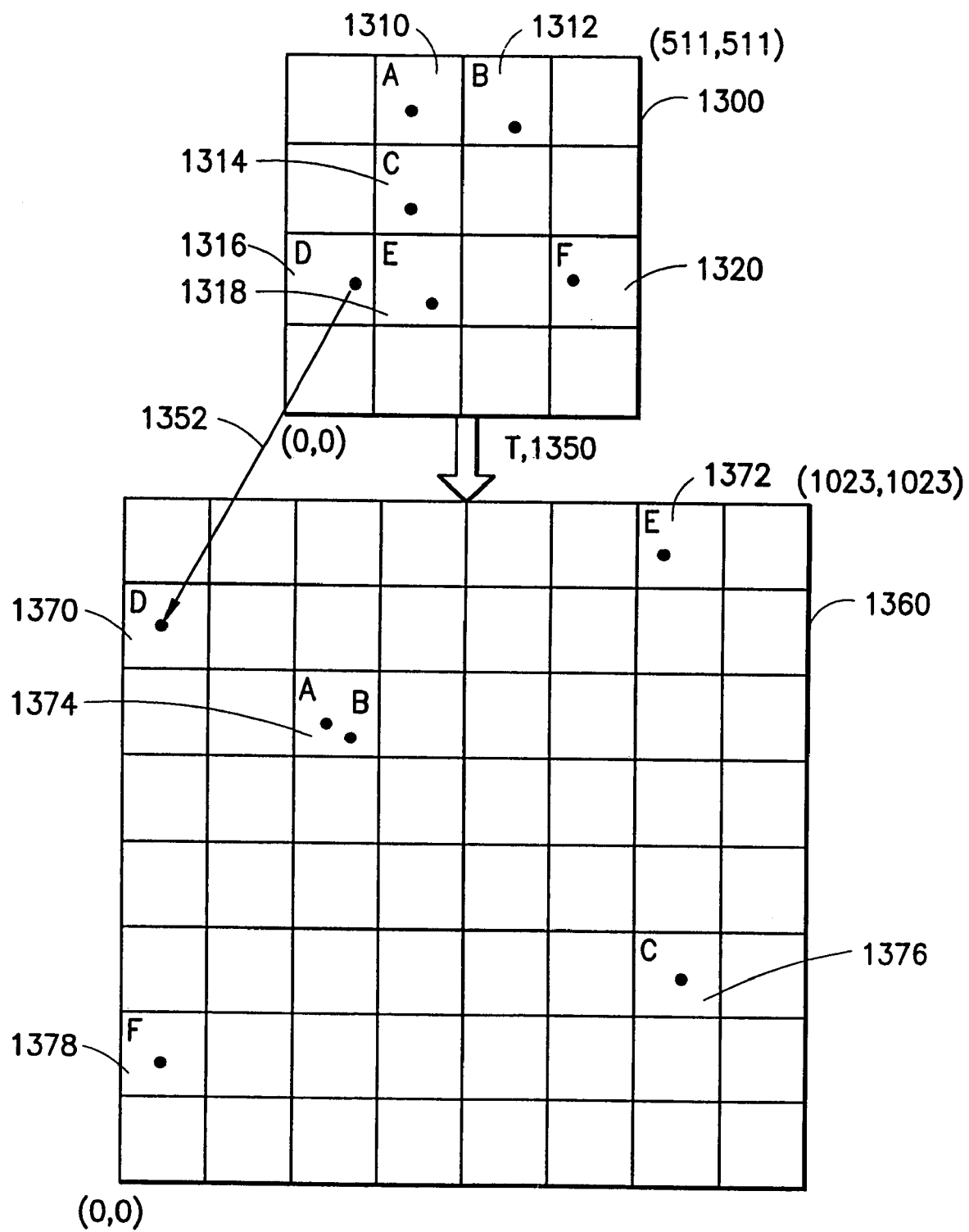
FIG. 13 is a cancelable distortion of a point set biometrics where the point set is distorted through a non-invertible transformation that maps the coordinates of the input point set into a larger space.

FIG. 13 is yet another cancelable distortion transformation of a point set representing the features from a biometrics signal. But in this case, randomly generated offsets are added to the x and y coordinates of the original feature set to remap the range of the x and y coordinates of the present set to a larger space. For example, the original range of the coordinate space for the point set 1300 in FIG. 13 is (511, 511). That is, x can range from a value of 0 up to a maximum of 511. After the transform, the range has been mapped to (1023, 1023) as shown in 1360. The points in the original feature set marked as 1310-1320 are mapped randomly (but repeatably) to the points shown in 1360. This might be done in a consistent way by associating a particular random offset with each subblock in original space 1300. Mapping all the contents of a block in the same way helps to preserve the local structure of the biometrics signal. But, note that due to randomness in the offsets, we may have several points in the original set which are mapped to the same point in the resulting set (such as the points A and B in 1360). This means the distortion is non-invertible, as discussed in relation to FIG. 8. The main advantage of this transform is that in the larger space, brute force attacks on the template are much harder.

Figure 14:
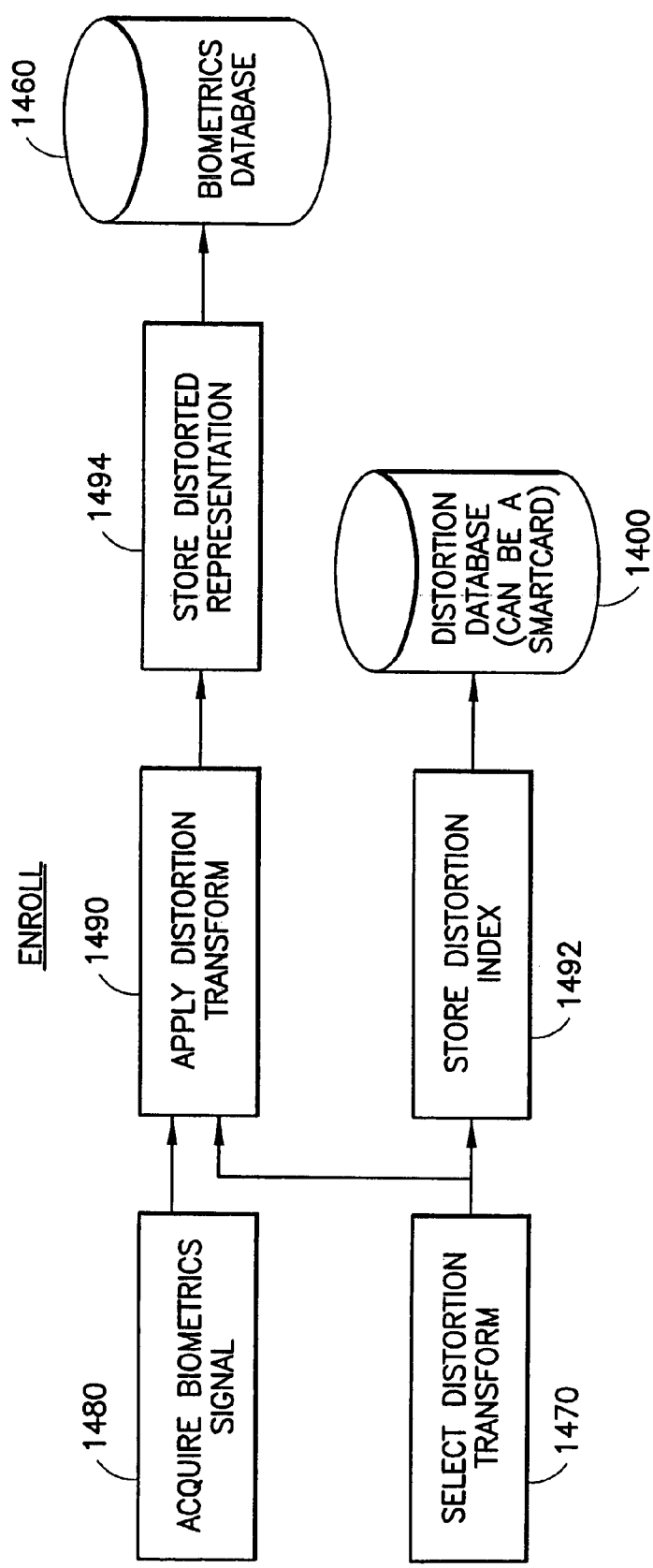
FIG. 14 shows the process of selecting a distortion for a user and enrolling the user by storing the reference distorted biometric.
Figure 15:
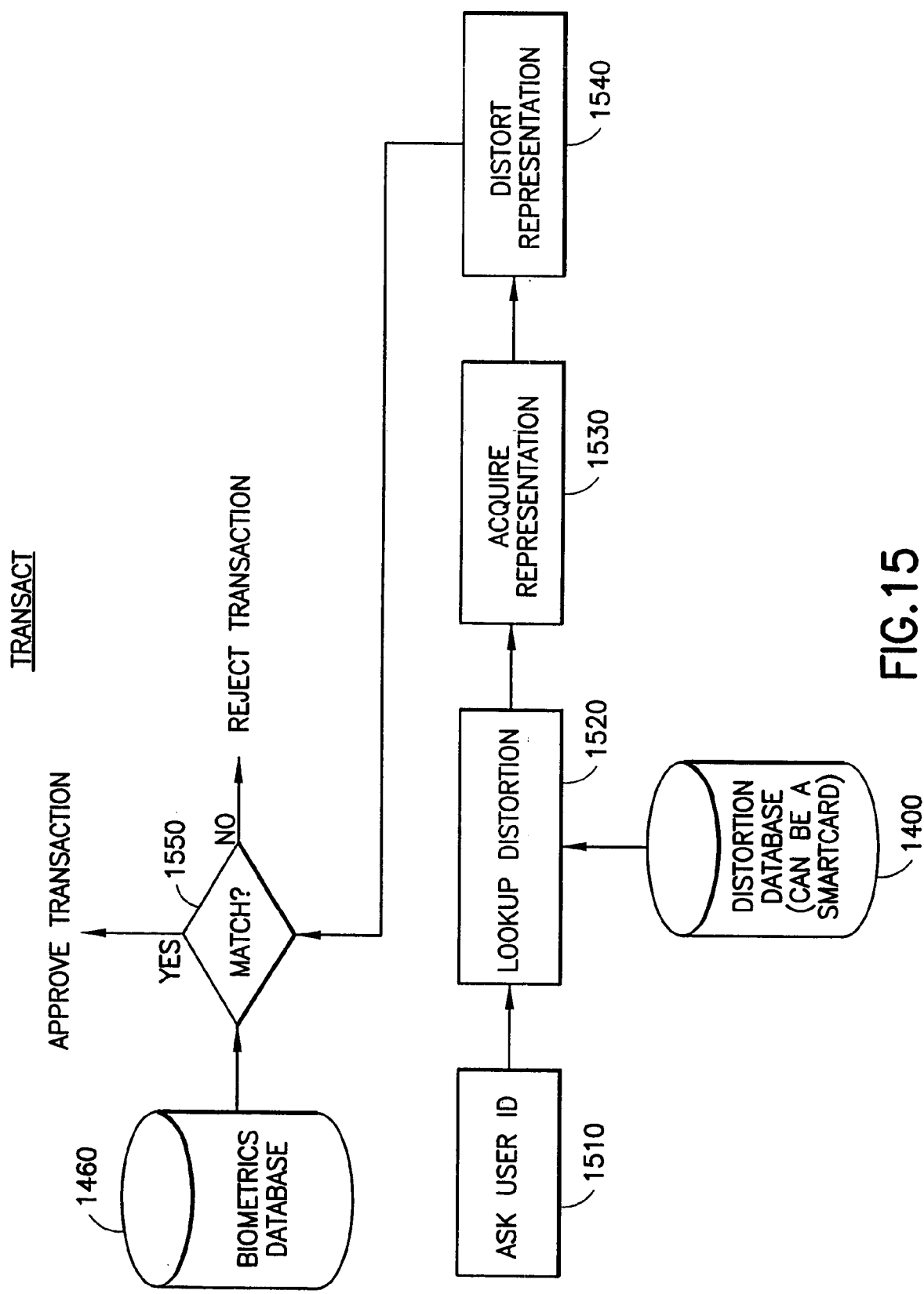
FIG. 15 shows the process of distorting a biometric signal in a prescribed way and then using it to authenticate a transaction.

The business use of an intentionally distorted biometric is depicted in FIGS. 14 and 15. This example shows how a distorted biometric is acquired (FIG. 14) and then used in a transaction processing system (FIG. 15). FIG. 14 shows the enrollment process. First, a particular distortion transformation is chosen 1470 for the user and stored in a database 1400. An external agency could supply some randomly generated distortion, or the user could type something like a password which would be hashed to generate an index by which a distortion would be selected. The ID-to-distortion database 1400 could be a remote computer connected to a network or, for greater privacy, a smartcard retained by the user. The system then acquires 1480 one or more samples of the biometric signal from the user, applies the specified distortion 1490, and stores the distorted signals 1494 (or some statistical digest of them) in a second database 1460. This completes the enrollment process.

As shown in FIG. 15, a similar process is used during transaction authentication. First, in step 1510 the user supplies his alleged identification to the system. The system uses this to lookup up the appropriate distortion 1520 from database 1400 (as registered during enrollment). Then a biometric inputs signal is requested and acquired 1530 and the specified distortion 1540 is applied. If database 1400 is a smartcard, the client machine (such as an ATM) can lookup and apply the distortion locally without consulting a remote server. This makes the process more efficient (less network traffic). It also guarantees that the specific details of the distortion are never broadcast over the network in any form, and that the server never has direct access to them. Finally, in step 1550 the authentication authority compares the submitted distorted biometrics with the reference distorted biometrics from database 1460 (created during enrollment). If the two match reasonably well, the transaction is authorized. Otherwise, the transaction is rejected and possibly logged for follow-up.

Figure 16:
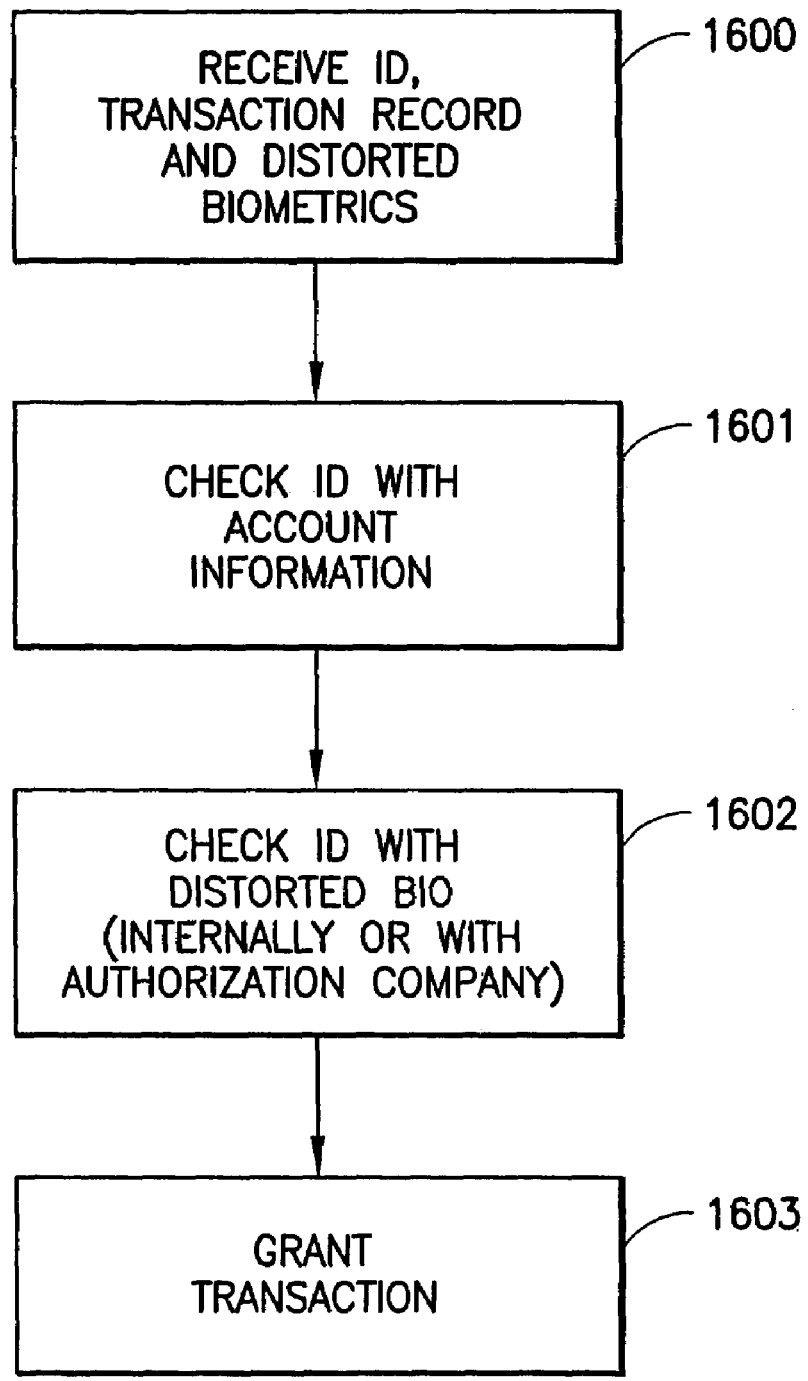
FIG. 16 depicts the steps involved in using a distorted biometrics in a transaction processing system.

As shown in FIG. 16, the distorted biometrics can be used in many applications including financial transaction approvals such as on-line credit card transactions. In this method, in step 1600, the system receives the ID of the person along with the transaction record that includes the details of the amount to be approved for the transaction and the distorted biometrics. In step 1601, the system checks the ID against the account information for the ID to ensure it is a valid and active ID and also if the transaction can be approved within the constraints of the account profile. The distorted biometrics is verified against the recorded biometrics for the person either internally or by requesting an authentication server in step 1602. If the result of the verification is positive, in step 1603 the authorization is granted in step 1603. Of course, steps 1601 and 1602 are independent and hence could be done in reversed order or in parallel if desired.

Figure 17:
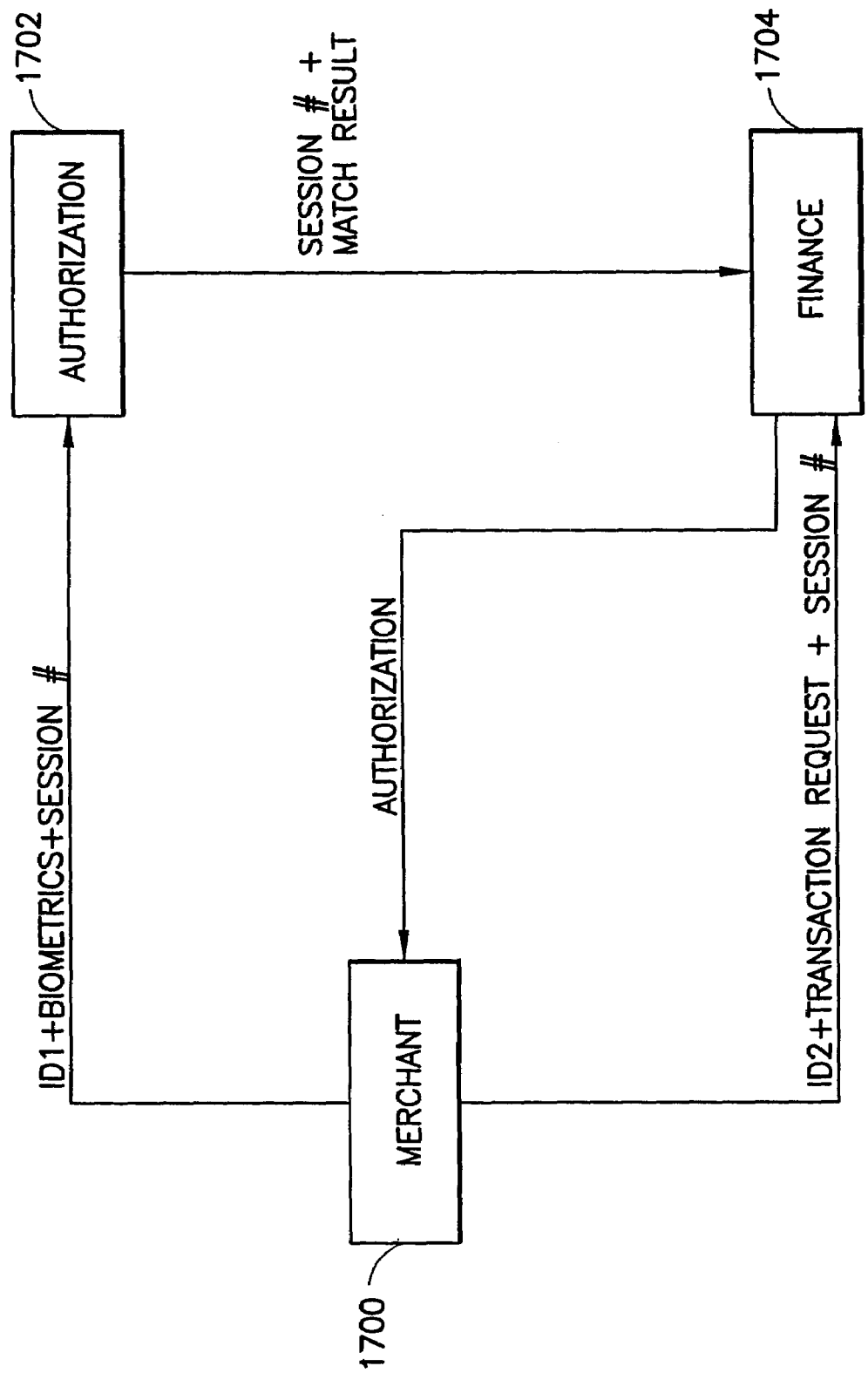
FIG. 17 gives the information flow diagram for using distorted biometrics in a transaction processing system involving separate authorization and finance servers.

In FIG. 17, the interplay between the merchant 1700, the authorization server 1702 and the finance institution 1704 is elaborated. In this mode, the merchant sends ID information ($ID_2$) and the transaction request to the financial institution. He also sends ID information ($ID_1$) and the biometrics to the authorization server. The biometrics may be distorted at authorization server 1702 based on $ID_1$ or, alternatively, for enhanced security they may be distorted locally at merchant 1700 site before transmission. In either case, after verifying the distorted biometrics against the record for user $ID_1$, authorization server 1702 sends a match acknowledgment to 1704, the server of the financial institute. The finance server examines the response from the authentication server, the transaction request and user $ID_2$ to decide if it can safely approve the transaction. It then communicates to the merchant either an approval or rejection notice for the transaction. In many cases $ID_1$ and $ID_2$ will be the same. However, to further enhance user privacy, the ID used by the authorization server 1702 might be different from the ID used by the finance (authorizing) server 1704. In this case there needs to be some sort of arbitrary tag, like a session number, that ties the two processes together.

Figure 18:
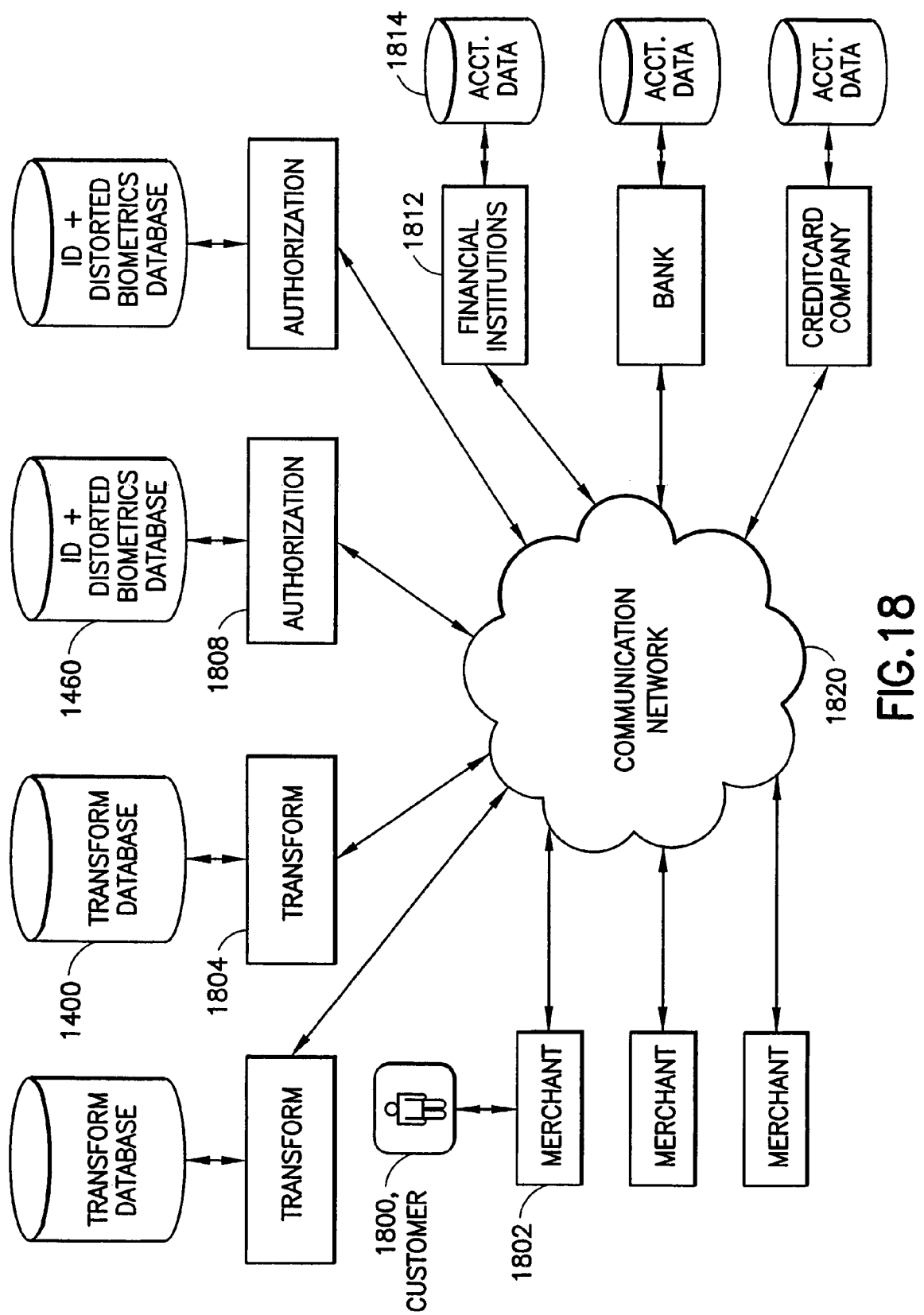
FIG. 18 shows a distributed network-based system for using distorted biometrics in a transaction processing environment having multiple transform servers, multiple authorization servers and multiple merchants.

Yet another embodiment is shown in FIG. 18. Here, the processes of distorting the original biometrics and authenticating the distorted version are divided between two separate service companies. As indicated in the figure, there may actually be several distortion suppliers, 1804, and several authentication services, 1808, available on the network.

To pay a merchant 1802 the charges for a service or product, a customer 1800 offers his/her biometrics and an ID number. The merchant uses communication network 1820 to first transmit the ID to transform server 1804 (assuming transform database 1400 is not on a user owned smartcard). The distortion transform for the given customer ID is retrieved from the transform database 1400 (transform server) and returned via the network to the merchant. The merchant then applies the specified distortion transform to the acquired user biometric and sends the result along with the user's alleged ID to the authentication server 1808. Alternatively, transform server 1804 could receive the user's true biometric from merchant 1802 and return a properly distorted version of it either directly to a specified authentication server 1808, or to the merchant for forwarding.

The authentication server 1808 verifies the submitted distorted biometrics signal against the records available in distorted biometrics database 1460. The result of the verification along with the relevant transaction details and user ID is then communicated via network 1820 either directly to the specified financial institution 1812, or to the merchant for appropriate forwarding. Institutions 1812 can include financial institutions 1812 may include banks, credit card agencies, stock brokers, auction houses, or electronic cash suppliers. (Generally, institutions can include any institution that provides a product or a service.) The (financial) server 1812 examines the transaction and the authentication results to decide whether to approve (authorize) the transaction. The authentication results may be on a graded scale such as:

"sure", "high likely", "possible", and "unlikely". The (financial) server may look at the nature of the transaction (e.g., $50 ATM withdrawal versus $3000 plane ticket) to decided what level of authentication is required. It then uses network 1820 to communicate the decision, an allowed amount and possibly a authorization number to merchant 1802 through the communication network 1802 who then services customer 1800 as appropriate.

Note that these implementations can also use the standard encryption techniques (prior art) before using a public communication medium. Note also, that although we have discussed the process whereby the merchant acts as a "hub" of communication, it is contemplated that one of the other entities may instead act as such a hub. For instance, the merchant 1802 might only communicate directly with financial institution 1812. This institution would then decide whether biometric identification was even necessary and, if so, first contact transform agency 1804 (which might actually be part of financial institution 1812 itself) and then contact authentication service 1808 before sending a response to the merchant.

Other functions that can be authenticated and/or authorized by the invention include: providing a service, executing a contract, closing a sale, submitting a bid, submitting an account number (an authorization, an identification, and/or a reservation request), making a purchase, providing a quote, allowing an access to a physical structure, allowing an access to a financial account, providing an authority to manipulate a financial account, providing an access to a database, providing access to information, making a request for a privilege, making a request for a network service, providing an offer for a network service, facilitating an auction, and authorizing an enrollment.

We claim:

1. A method of doing business comprising the steps of:
   distorting in a processor a digital representation of one or more undistorted biometrics of a user to create a distorted biometric using one or more transformations; and
   determining, in response to a transaction, whether the distorted biometric matches with one or more stored distorted biometrics, the determining act being undertaken without knowing the undistorted biometric so that the distorted biometric represents a user without revealing the digital representation of the one or more undistorted biometrics.

2. A method, as in claim 1, where the biometric is a physical characteristic.

3. A method, as in claim 1, where the biometric is a behavioral characteristic.

4. A method, as in claim 1, where the biometric includes anyone or more of the following: one or more fingerprints, one or more minutiae, a voice pattern, a facial image, an iris, a hand signature, a auditory signature, a gesture, and a gait.

5. A method, as in claim 1, where the transaction is for one or more of the following: use of a financial instrument, providing a service, executing a contract, a sale, a bid, a submitted account number, an authorization, an identification, a reservation request, a purchase, a quote, an access to a physical structure, an access to a financial account, an authority to manipulate a financial account, an access to a database, an access to information, a request for a privilege, a request for a network service, an offer for a network service, an auction, and an enrollment.

6. A method, as in claim 1 where the distorted biometric is used to authenticate the user.

7. A method, as in claim 1, where the user is anyone or more of the following: a customer, a customer submitting an order on a network, a client, an employee, a user of a service, and a purchaser of a product.

8. A method, as in claim 1, being performed by any one or more of the following: the user, a company, a service company, a company selling products, a bank, a computer, and a credit card company.

9. A method of doing business comprising the steps of:
   receiving one or more distorted biometrics associated with a user identifier, wherein said one or more distorted biometrics were created using one or more transformations of a digital representation of one or more biometrics of a user, at least one of the transformations comprising one or more non-invertible functions;
   storing a plurality of records in one or more databases, each record having one or more distorted biometrics and a user identifier; and
   receiving one or more requests from a requester, the one or more requests containing one or more target distorted biometrics associated with a target identifier;
   comparing in a processor the one or more requests with one or more of the records; and
   providing the requester with an indication that the target distorted biometric and the target identifier matched one or more of the respective one or more distorted biometrics and associated user identifiers.

10. A method, as in claim 9, further comprising the step of storing a distortion transform used to create the distorted biometric from the digital representation of the one or more biometrics of the user.

11. A method, as in claim 9, where the distorted biometric can not be inverted to a digital representation of the biometric from which the distorted biometric was created.

12. A method, as in claim 9, where the distorted biometric is canceled by allowing a user to replace the distorted biometric with a second distorted biometric.

13. A method, as in claim 12, where the second distorted biometric is created by a second distortion transform that is different than a first distortion transform used to create the distorted biometric.

14. A method, as in claim 9, where the requester is anyone or mare of the following: a financial company, a bank, a brokerage, a credit card company, and a merchant.

15. A method of granting authorization of a transaction, the method comprising the steps of:
   receiving a user identifier, a distorted biometric and a transaction request, wherein said distorted biometric was created using one or more transformations of a digital representation of one or more biometrics of a user, at least one of the transformations comprising one or more non-invertible functions;
   checking the user identifier with information about one or more accounts of the user;
   verifying the identity of the user by comparing in a processor the received user identifier with a stored user identifier and comparing the received distorted biometric with a stored distorted biometric associated with the stored user identifier; and
   granting authorization for the transaction request if the information about the account is in good standing and the distorted biometric is associated with the user, wherein said distorted biometric was created using the one or more transformations.

16. A method, as in claim 15, where the identity of the user is verified by receiving an acknowledgment from a remote computer that the user identifier is associated with the digital representation of the distorted biometric.

17. A method of doing business comprising the steps of:
sending a user identifier and an associated digital representation of a user biometric to a remote computer that distorts the digital representation of the user biometric to a distorted biometric using one or more transformations, at least one of the transformations comprising one or more non-invertible functions;
sending the user identifier and a transaction request to a financial company;
determining in a processor that the user identifier is associated with the distorted biometric and sending an acknowledgment to the financial company; and
receiving an authorization for the transaction request from the financial company if the acknowledgment is sent and the user identifier is associated with a account in good standing.

18. A method of doing business comprising the steps of:
sending a transaction request, a user identifier, and a distorted biometric determined in a processor using one or more transformations that transform a digital representation of one or more undistorted biometrics of a user to the distorted biometric;
providing a tester with a comparison distorted biometric but not providing the tester with the undistorted biometrics; and
instructing the tester to compare the comparison distorted biometric with the distorted biometric to determine whether to authorize a transaction defined by the transaction request.

* * * * *